(12) United States Patent
Xu et al.

(10) Patent No.: US 12,385,595 B2
(45) Date of Patent: Aug. 12, 2025

(54) MOBILE BRACKET

(71) Applicant: Xinadda (Hong Kong) Limited, Hong Kong (CN)

(72) Inventors: Hao Xu, Hong Kong (CN); Yongyi Xiong, Hong Kong (CN); Lei Sun, Hong Kong (CN)

(73) Assignee: Xinadda (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/520,283

(22) Filed: Nov. 27, 2023

(65) Prior Publication Data

US 2025/0020267 A1 Jan. 16, 2025

(30) Foreign Application Priority Data

Jul. 14, 2023 (CN) .......................... 202321860846.3

(51) Int. Cl.
| | |
|---|---|
| *F16M 11/04* | (2006.01) |
| *F16M 11/10* | (2006.01) |
| *F16M 11/28* | (2006.01) |
| *F16M 11/42* | (2006.01) |

(52) U.S. Cl.
CPC ......... *F16M 11/046* (2013.01); *F16M 11/105* (2013.01); *F16M 11/28* (2013.01); *F16M 11/42* (2013.01)

(58) Field of Classification Search
CPC .... F16M 11/046; F16M 11/105; F16M 11/28; F16M 11/42
USPC ...................................................... 248/124.1
See application file for complete search history.

(56) References Cited

U.S. PATENT DOCUMENTS

| | | | | |
|---|---|---|---|---|
| 5,751,548 | A * | 5/1998 | Hall .................... | F16M 11/2064 361/679.41 |
| 5,975,472 | A * | 11/1999 | Hung ................... | F16M 13/022 248/278.1 |
| 6,189,842 | B1 * | 2/2001 | Bergeron Gull ....... | F16M 11/24 248/283.1 |
| 7,764,491 | B2 * | 7/2010 | Zhao ................... | F16M 11/2014 361/679.22 |
| 7,815,154 | B2 * | 10/2010 | Oh ........................ | F16M 11/28 248/176.3 |
| 8,408,505 | B2 * | 4/2013 | Ye ........................ | F16M 11/105 248/176.1 |
| 11,284,711 | B2 * | 3/2022 | Rossini .................... | A47B 9/10 |

(Continued)

*Primary Examiner* — Anita M King
(74) *Attorney, Agent, or Firm* — IP Spring

(57) ABSTRACT

The present disclosure provides a mobile bracket including a bottom base, a first supporting rod, a second supporting rod, a pitch adjustment assembly and a rotation adjustment assembly. The bottom base is connected to a bottom end of the first supporting rod. The second supporting rod is connected to a top end of the first supporting rod. The pitch adjustment assembly is connected to one end of the second supporting rod far from the first supporting rod. The pitch adjustment assembly is capable of rotating relative to the second supporting rod to adjust a pitch angle. The pitch adjustment assembly includes a mounting plate. The rotation adjustment assembly is rotatably connected to the mounting plate. The rotation adjustment assembly is capable of rotating around an axis perpendicular to the mounting plate to adjust a rotation angle. The rotation adjustment assembly is configured to be connected to a display.

19 Claims, 37 Drawing Sheets

(56) References Cited

U.S. PATENT DOCUMENTS

| | | | |
|---|---|---|---|
| 12,079,031 B2 * | 9/2024 | Jeon | F16M 11/105 |
| 12,085,980 B2 * | 9/2024 | Luo | G06F 1/1601 |
| 12,228,975 B2 * | 2/2025 | Lee | G09G 3/20 |
| 2006/0219849 A1 * | 10/2006 | Chiu | F16M 11/2021 |
| | | | 248/917 |
| 2007/0227409 A1 * | 10/2007 | Chu | A47B 21/00 |
| | | | 108/50.02 |

* cited by examiner

MOBILE BRACKET

CROSS-REFERENCE TO RELATED APPLICATION(S)

This application claims priority under 35 U.S.C. § 119(a) to Chinese Patent Application No. 202321860846.3, filed Jul. 14, 2023, the entire disclosure of which is incorporated herein by reference.

TECHNICAL FIELD

The present disclosure relates to a technical field of display mounting, and in particular relates to a mobile bracket.

BACKGROUND

Existing floor stands for mounting a display can realize a height lifting adjustment and a left and right rotating adjustment. But they can not realize angle adjustments in other degrees of freedom. Therefore, existing floor stands cannot adapt to a variety of occasions of adjustments for display angle.

SUMMARY

For this purpose, the present disclosure proposes a mobile bracket to solve at least one of the above mentioned technical problems.

In order to solve the above mentioned technical problems, the technical solutions of the present disclosure are as follows.

The present disclosure provides a mobile bracket. The mobile bracket includes a bottom case, a first supporting rod, a second supporting rod, a pitch adjustment assembly, and a rotation adjustment assembly. The bottom case is connected to a bottom end of the first supporting rod. The second supporting rod is connected to a top end of the first supporting rod. The pitch adjustment assembly is connected to one end of the second supporting rod far from the first supporting rod. The pitch adjustment assembly is capable of rotating up and down relative to the second supporting rod so as to adjust a pitch angle. The pitch adjustment assembly includes a mounting plate located at one end far from the first supporting rod. The rotation adjustment assembly is rotatably connected to the mounting plate. The rotation adjustment assembly is capable of rotating around an axis perpendicular to the mounting plate so as to adjust a rotation angle. The rotation adjustment assembly is configured to be connected to a back of a display.

The beneficial effect of the present disclosure compared to the prior art is as follows.

In the present disclosure, the pitch adjustment assembly which is capable of rotating up and down relative to the second supporting rod is adopted to adjust a pitch angle: the rotation adjustment assembly which is capable of rotating around an axis perpendicular to the mounting plate is adopted to adjust a rotation angle. Therefore, the present disclosure not only can adjust the pitch angle of the display, but also can adjust the rotation angle of the display to realize horizontal and vertical screen conversion, thus increasing the degrees of freedom in the angle adjustment of the display.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely at least one embodiment of the present disclosure, those of ordinary skilled in the art may also obtain other drawings based on these drawings without any creative efforts.

DETAILED DESCRIPTION OF ILLUSTRATED EMBODIMENTS

Embodiments of the present disclosure are described in detail below. Examples of the embodiments are shown in the accompanying drawings. The same or similar labeling throughout denotes the same or similar elements or elements having the same or similar functions. The embodiments described below by reference to the accompanying drawings are exemplary and are intended to be configured to explain the present disclosure and are not to be construed as limiting the present disclosure.

Furthermore, the terms "first" and "second" are used for descriptive purposes only and are not to be understood as indicating or implying relative importance or implicitly specifying the number of technical features indicated. Therefore, a feature defined with "first" or "second" may include one or more such features, either explicitly or implicitly. In the description of the present disclosure, "more than one" means two or more, unless otherwise expressly and specifically limited.

In the present disclosure, unless otherwise expressly specified and limited, the terms "connected", "fixed", and the like are to be understood broadly, e.g., they may be fixedly connected, removably connected, or integrally connected: they may be mechanically connected or electrically connected: they may be directly connected or indirectly connected through an intermediate medium; they may be interconnected within two elements or an interactive relationship between two elements. For those of ordinary skill in the art, the specific meaning of the above terms in the present disclosure may be understood on a case-by-case basis.

Figure 1:
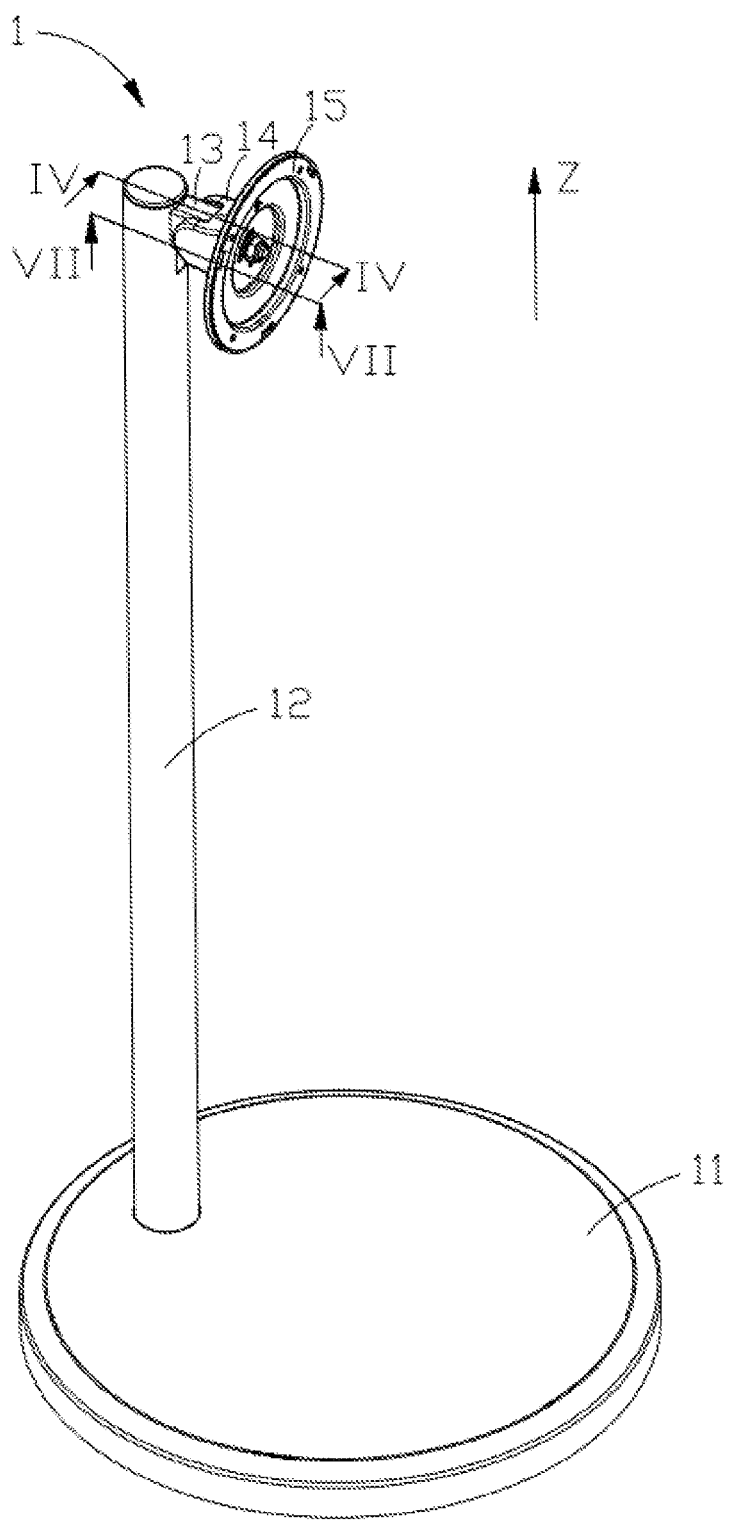
FIG. 1 illustrates a three-dimensional structural schematic diagram of a mobile bracket in accordance with a first embodiment of the present disclosure.
Figure 2:
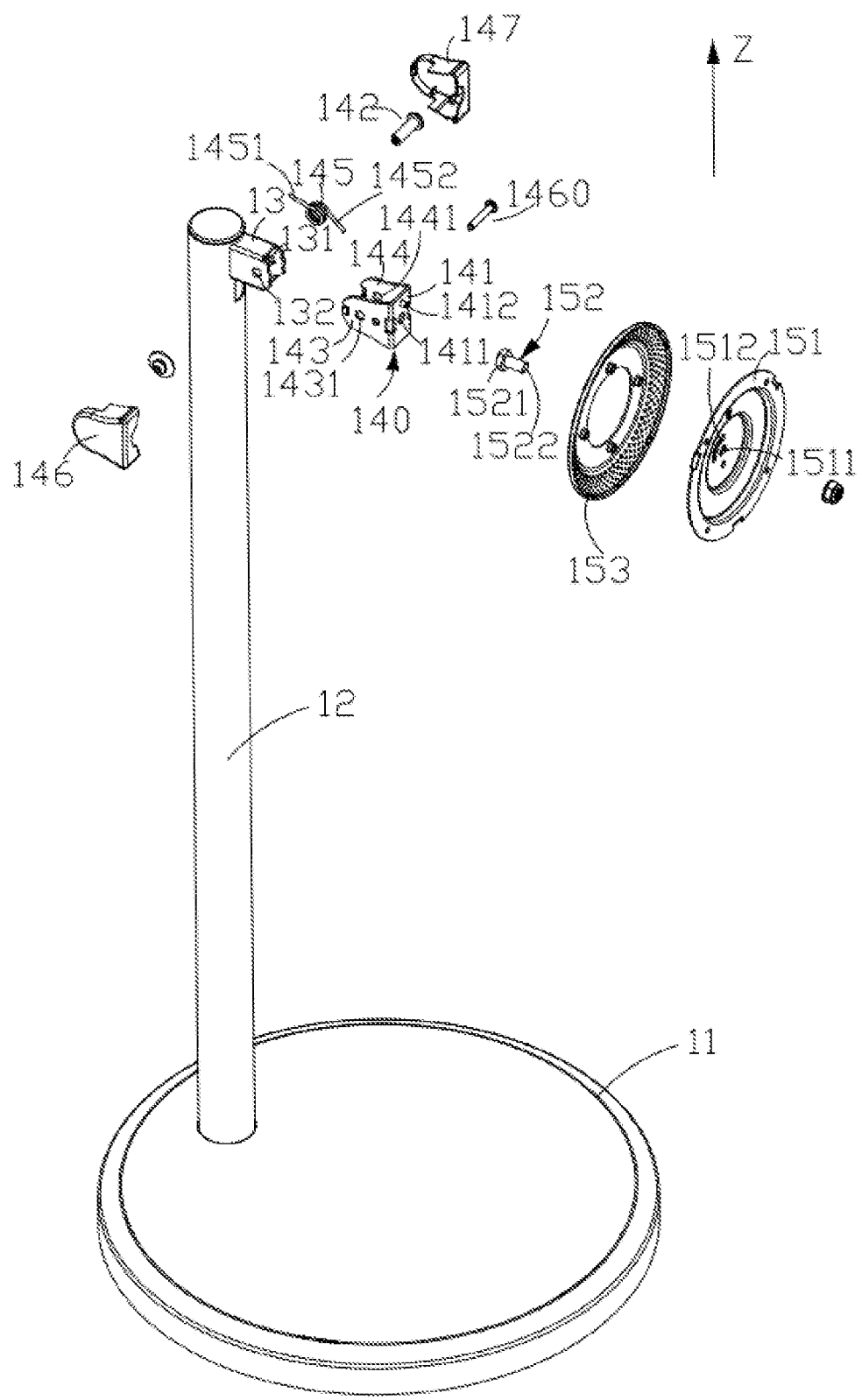
FIG. 2 illustrates an exploded diagram of the mobile bracket in FIG. 1.

Referring to FIGS. 1 and 2, FIG. 1 illustrates a three-dimensional structural schematic diagram of a mobile bracket in accordance with a first embodiment of the present disclosure; and FIG. 2 illustrates an exploded diagram of the mobile bracket in FIG. 1.

For convenience of description, a height direction of the mobile bracket 1 shown in FIG. 1 is defined as a Z-axis direction, with a positive direction toward the Z-axis direction as a "top", and a negative direction toward the Z-axis direction as a "bottom", which does not constitute a limitation of the mobile bracket 1 in practical application scenarios.

As shown in FIGS. 1 and 2, the mobile bracket 1 includes a bottom base 11, a first supporting rod 12, a second supporting rod 13, a pitch adjustment assembly 14 and a rotation adjustment assembly 15. The bottom base 11 is connected to a bottom end of the first connecting rod 12. The second supporting rod 13 is connected to a top end of the first supporting rod 12. The pitch adjustment assembly 14 is connected to one end of the second supporting rod 13 far from the first supporting rod 12. The pitch adjustment assembly 14 is capable of rotating up and down relative to the second supporting rod 13 so as to adjust a pitch angle. The pitch adjustment assembly 14 includes a mounting plate 141 located at one end far from the first supporting rod 12. The rotation adjustment assembly 15 is rotatably connected to the mounting plate 141. The rotation adjustment assembly 15 is capable of rotating around an axis perpendicular to the mounting plate 141 so as to adjust a rotation angle. The rotation adjustment assembly 15 is configured to be connected to a back of a display (not shown).

In the present disclosure, the pitch adjustment assembly 14 which is capable of rotating up and down relative to the second supporting rod 13 is adopted to adjust a pitch angle: the rotation adjustment assembly 15 which is capable of rotating around an axis perpendicular to the mounting plate 141 is adopted to adjust a rotation angle. Therefore, the present disclosure not only can adjust the pitch angle of the display, but also can adjust the rotation angle of the display to realize horizontal and vertical screen conversion, thus increasing the degrees of freedom in the angle adjustment of the display.

Figures 3A, 3B:
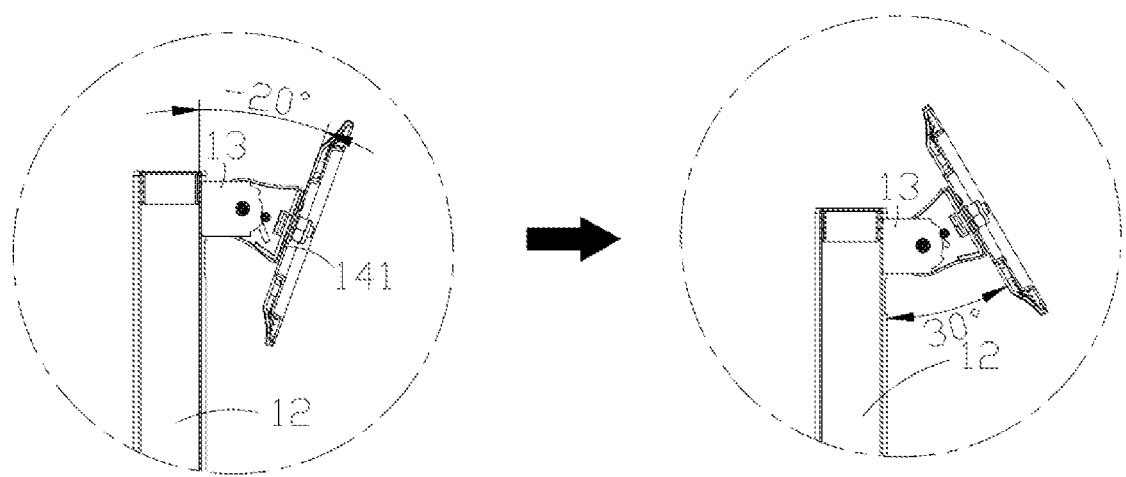
FIGS. 3A and 3B illustrate schematic diagrams of pitch angle adjustment of the mobile bracket in accordance with the first embodiment of the present disclosure.

In at least one embodiment, referring to FIGS. 3A and 3B, the range of the pitch adjustment angle of the pitch adjustment assembly 14 is −20° to 30°. The angle is an angle between the mounting plate 141 and a center axis of the first supporting rod 12. It can be understood that in other embodiments, a range of the pitch adjustment angle may be adjusted according to an actual need and is not limited herein.

Thereby, when the pitch adjustment angle of the pitch adjustment assembly 14 is within a range of −20° to 30°, the pitch adjustment needs in more application scenarios can be met.

Figure 4:
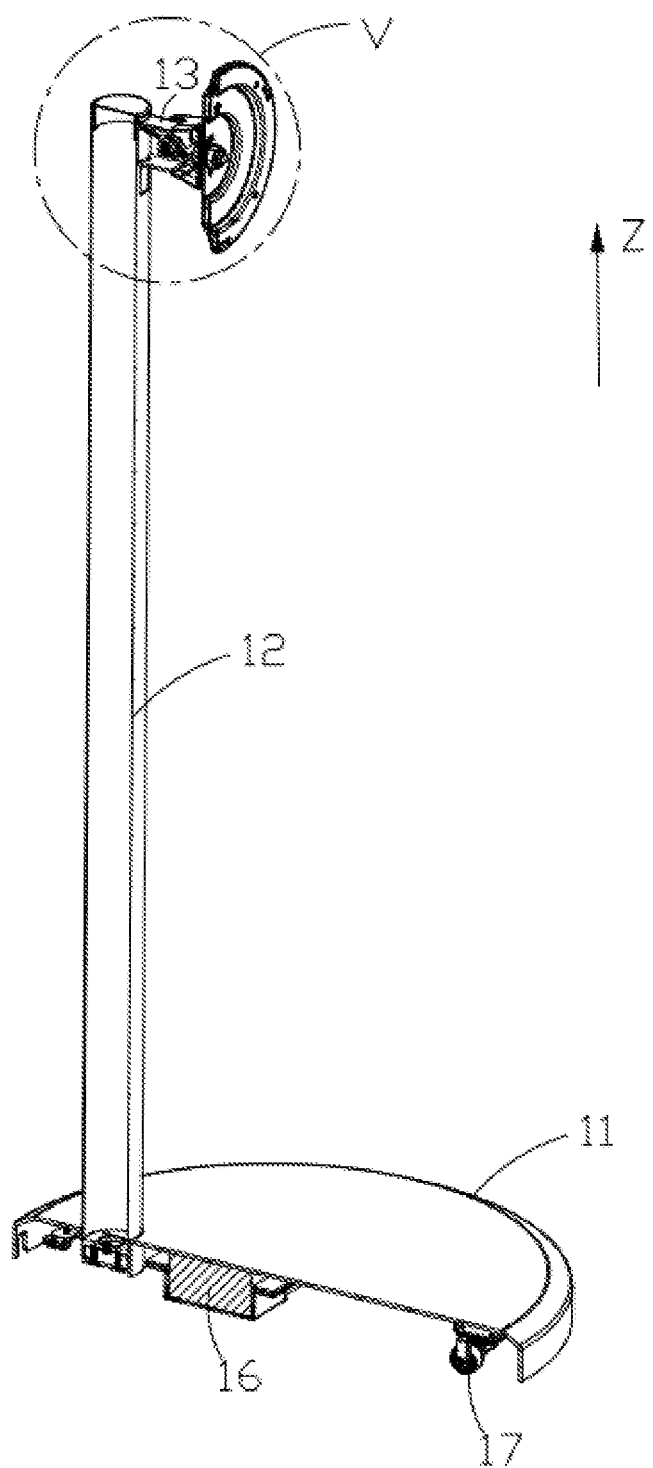
FIG. 4 illustrates a cross-sectional three-dimensional schematic diagram of FIG. 1 taken along a line IV-IV.
Figure 5:
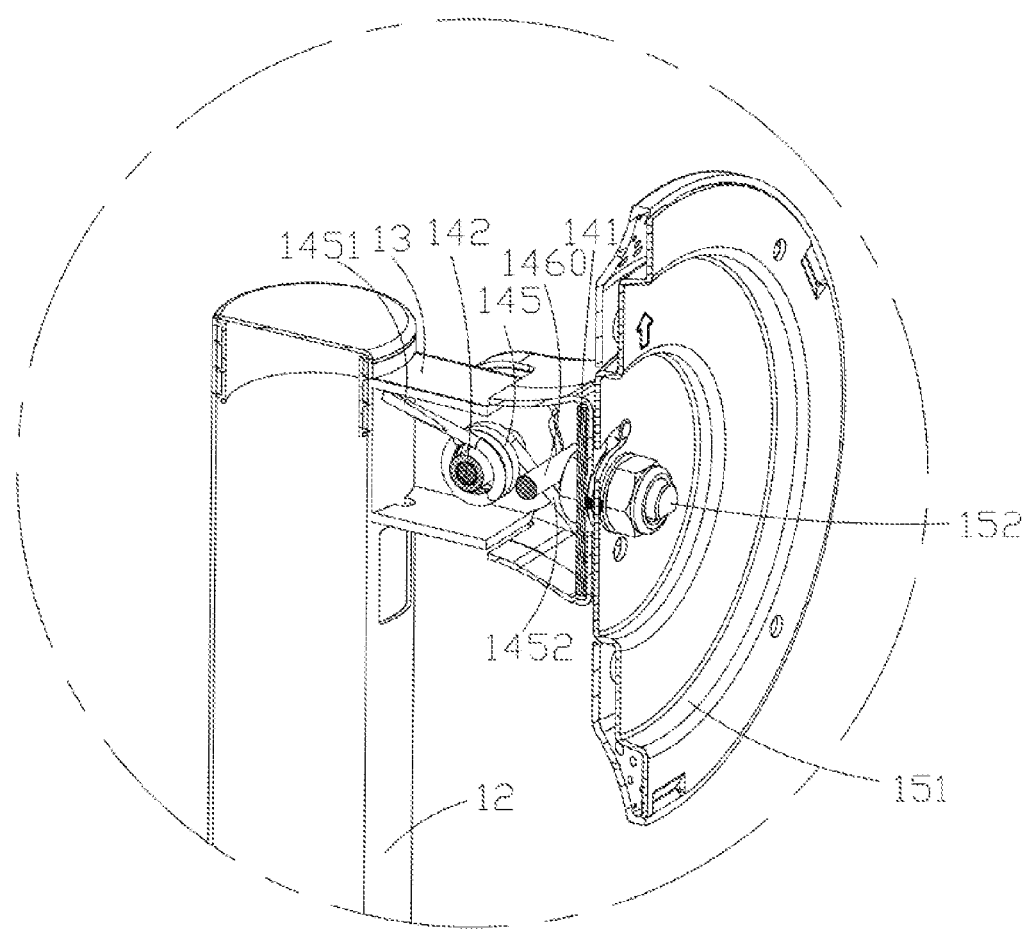
FIG. 5 illustrates a partially enlarged view of FIG. 4 at V.

In at least one embodiment, referring to FIGS. 2, 4 and 5, the pitch adjustment assembly 14 includes a rotating shaft 142 and a connecting arm 140. The rotating shaft 142 is connected to one end of the second supporting rod 13 far from the first supporting rod 12. The connecting arm 140 is rotatably connected to the rotating shaft 142. The connecting arm 140 is capable of rotating around a center axis of the rotating shaft 142, thereby achieving a need for adjusting pitch angle.

In at least one embodiment, the connecting arm 140 is substantially U-shaped. The connecting arm 140 includes the mounting plate 141, a first arm 143 and a second arm 144 extending coextensively from a surface of the mounting plate 141. The first arm 143 and the second arm 144 are spaced apart from each other. The first arm 143 defines a first through hole 1431. The second arm 144 defines a second through hole 1441. The second supporting rod 13 defines a third through hole 131 and a fourth through hole 132. The rotating shaft 142 passes through the second through hole 1441, the third through hole 131, the first through hole 1431, and the fourth through hole 132 to rotatably connect the first arm 143 and the second arm 144 to the end of the second supporting rod 13 far from the first supporting rod 12.

Thereby, the rotating shaft 142 can rotatably connect the connecting arm 140 to the second supporting rod 13 at the end of the second supporting rod 13 far from the first supporting rod 12, achieving to adjust the pitch angle of the display.

In at least one embodiment, referring to FIGS. 2 and 5 together, the pitch adjustment assembly 14 further includes a torsion spring 145 and a limiting rod 1460. The torsion spring 145 is threaded onto the rotating shaft 142. The torsion spring 145 includes a first free end 1451 and a second free end 1452 extending in opposite directions. The first free end 1451 resists against a top wall within the second supporting rod 13. The limiting rod 1460 is secured between the first arm 143 and the second arm 144, and is located between the rotating shaft 142 and the mounting plate 141 and is parallel to the rotating shaft 142. The second free end 1452 is held against a lower side of the limiting rod 1460.

Therefore, when the rotation adjustment assembly 15 and the display as a whole are adjusted to an upward elevation state, as the rotation adjustment assembly 15 and the display have a certain weight, there will be a tendency for a downward movement relative to the second supporting rod 13, the second free end 1452 of the torsion spring 145 resists against the lower side of the limiting rod 1460, which can at least partially offset the gravity force and prevent the pitch angle of the display from changing due to gravity force when the display is adjusted to the upward elevation state.

Figure 6:
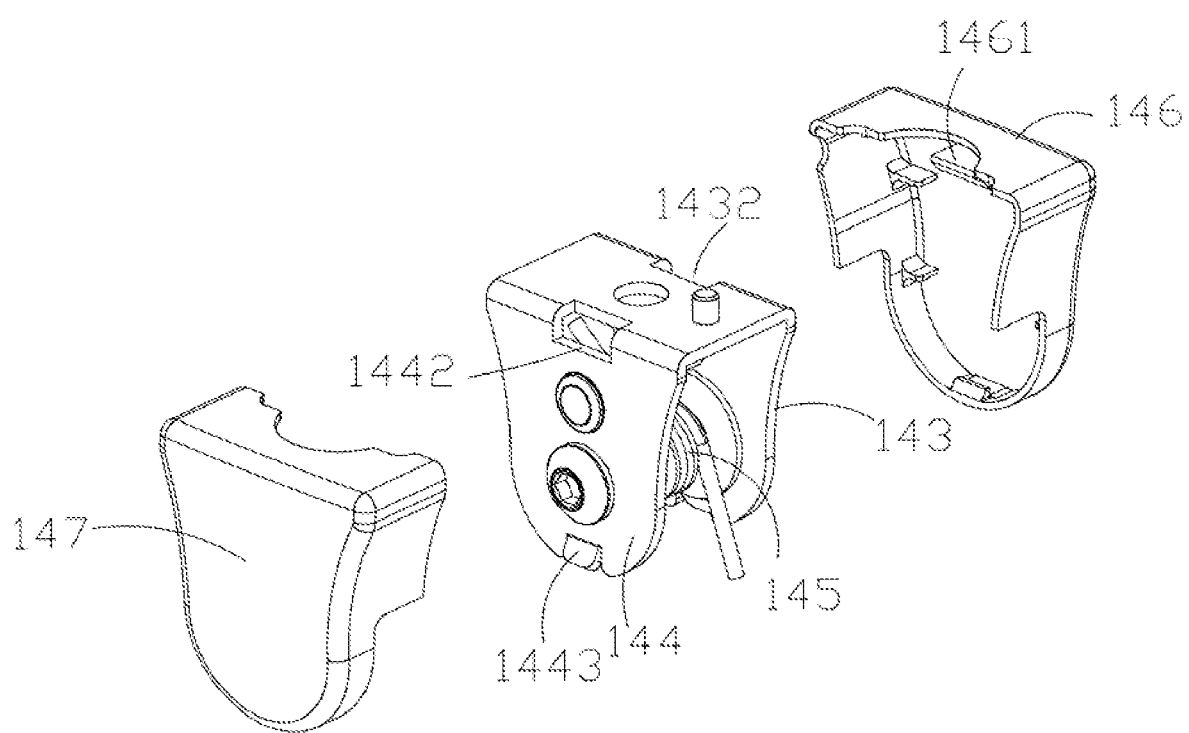
FIG. 6 illustrates an exploded diagram of a pitch adjustment assembly in accordance with the first embodiment of the present disclosure.
Figure 7:
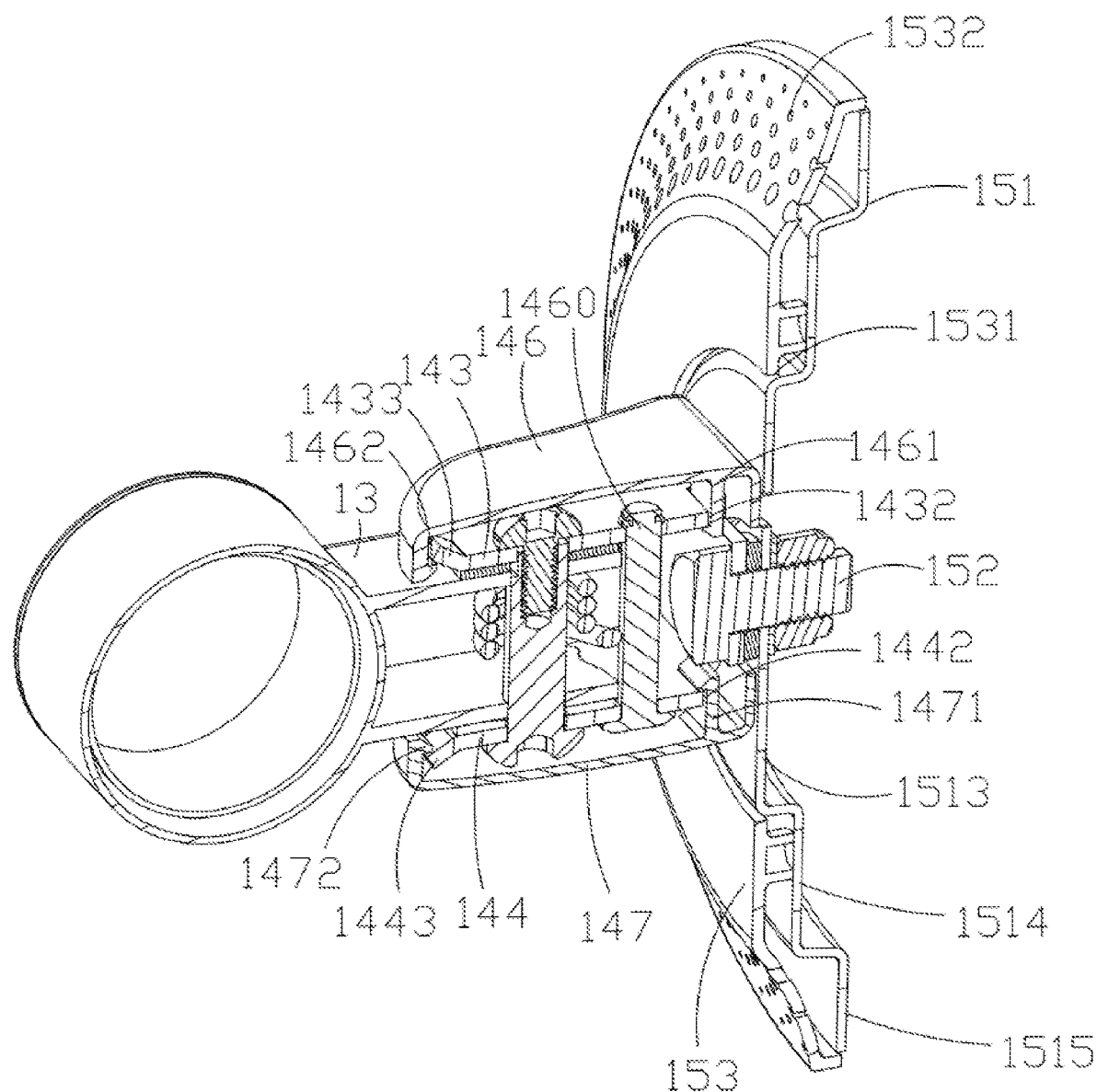
FIG. 7 illustrates a cross-sectional three-dimensional schematic diagram of FIG. 1 taken along a line VII-VII.

In at least one embodiment, referring to FIGS. 2, 6 and 7 together, the pitch adjustment assembly 14 further includes a first shell 146 and a second shell 147. The first shell 146 is connected to the first arm 143. The second shell 147 is connected to the second arm 144. The first shell 146 has a first hook 1461 protruding from an inner wall of the first shell 146. The first arm 143 defines a first hole 1432 corresponding to a position of the first hook 1461. When the first shell 146 is connected to an outside of the first arm 143, the first hook 1461 passes through the first hole 1432 and snaps onto the inner wall of the first arm 143. The second shell 147 has a second hook 1471 protruding from an inner wall of the second arm 147. The second arm 144 defines a second hole 1442 corresponding to a position of the second hook 1471. When the second shell 147 is connected to an outside of the second arm 144, the second hook 1471 passes through the second hole 1442 and snaps onto the inner wall of the second arm 144.

Thereby, the first shell 146 can be snapped onto the first arm 143, and the second shell 147 can be snapped onto the second arm 144; the connecting arm 140 is covered by the first shell 146 and the second shell 147 for aesthetic purposes.

In at least one embodiment, the first shell 146 includes a first snap portion 1462 at a position far from the mounting plate 141. The first arm 143 includes a first inclined portion 1433 at a position corresponding to the first snap portion 1462. The first snap portion 1462 is snapped onto the first inclined portion 1433. The second shell 147 includes a second snap portion 1472 at a position far from the mounting plate 141. The second arm 144 includes a second inclined portion 1443 at a position corresponding to the second snap portion 1472. The second snap portion 1472 is snapped onto the second inclined portion 1443.

Thereby, the first shell 146 can be further secured by the first snap portion 1462 being snapped onto the first inclined portion 1433, and the second shell 147 can be further secured by the second snap portion 1472 being snapped onto the second inclined portion 1443, such that the first shell 146 and the second shell 147 can be mounted more stably.

In at least one embodiment, referring to FIGS. 5 and 6, portions of the first shell 146 and the second shell 147 corresponding to the second supporting rod 13 have hollowed spaces.

When the pitch adjustment assembly 14 is rotated upwardly relative to the second supporting rod 13 to a certain angle, a travel of the pitch adjustment assembly 14 in its upward rotational movement will be limited by the first shell 146 and the second shell 147, so that an upward angle range of the pitch adjustment assembly 14 can be adjusted by adjusting a size of the hollowed spaces of the first shell 146 and the second shell 147.

In at least one embodiment, referring again to FIG. 2, the rotation adjustment assembly 15 includes a rotating plate 151 and a connecting member 152. The rotating plate 151 is configured to be connected to the back of the display. The connecting member 152 connects the mounting plate 141 and the rotating plate 151. The rotating plate 151 and the connecting member 152 are stop-rotationally connected to each other, and the connecting member 152 can rotate relative to the mounting plate 141.

In a specific embodiment, the connecting member 152 includes a head portion 1521 and a connecting rod 1522. The connecting rod 1522 is in a shape of a semi-cylindrical cylinder. The head portion 1521 and the connecting rod 1522 are connected. The mounting plate 141 defines a first connecting hole 1411. The first connecting hole 1411 is a circular hole. A center of the rotating plate 151 defines a second connecting hole 1511. The second connecting hole 1511 is a semicircular hole. The head portion 1521 resists against one end of the mounting plate 141 far from the rotating plate 151. The connecting rod 1522 passes through the first connecting hole 1411 as well as the second connecting hole 1511 and is then connected to a nut.

Thereby, the rotating plate 151 and the connecting member 152 are stop-rotationally connected, the connecting member 152 can rotate relative to the mounting plate 141, realizing a rotatable connection between the rotating plate 151 and the mounting plate 141. The rotating plate 151 is capable of rotating relative to a center axis of the connecting member 152.

In at least one embodiment, the mounting plate 141 includes a protrusion 1412 on a side of the mounting plate 141 facing the rotating plate 151. The rotating plate 151 defines a guiding groove 1512 corresponding to the protrusion 1412. The guiding groove 1512 is a curved groove centered on a center of the rotating plate 151. The protrusion 1412 is inserted into the guiding groove 1512 to form a limit to a rotational travel of the rotation adjustment assembly 15.

Figure 8A:
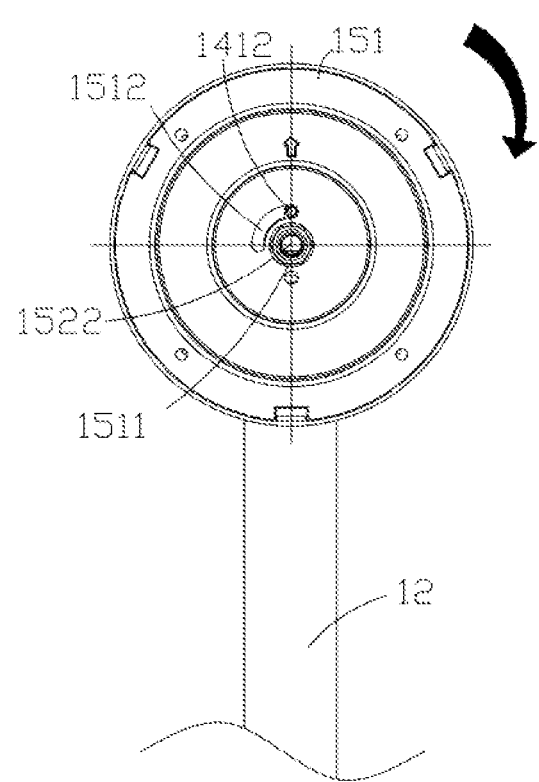
FIGS. 8A and 8B illustrate schematic diagrams of rotation angle adjustment of the mobile bracket in accordance with the first embodiment of the present disclosure.
Figure 8B:
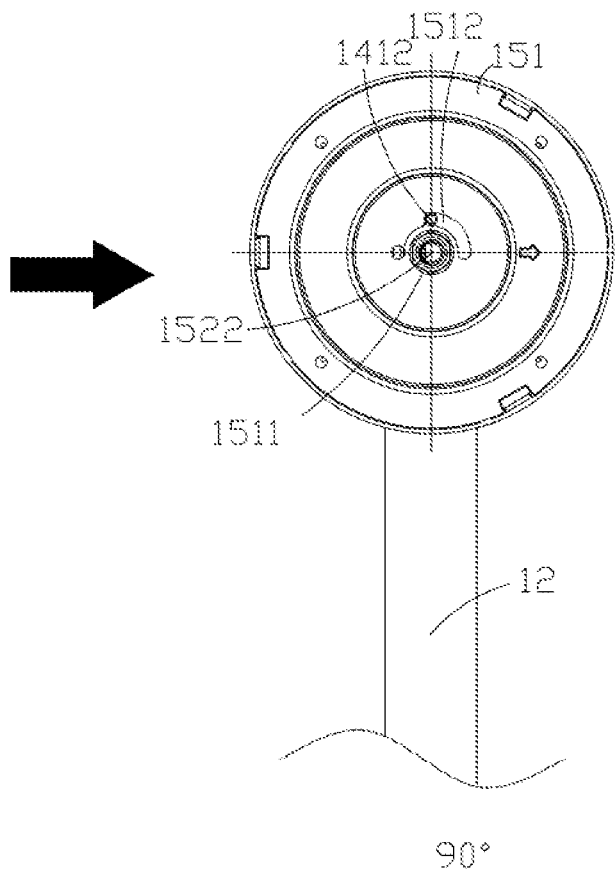

In a specific embodiment, referring to FIGS. 8A and 8B together, when the protrusion 1412 does not move, rotating the rotating plate 151 can cause the guiding groove 1512 of the rotating plate 151 to exhibit a different positional relationship to the protrusion 1412, i.e., such that the protrusion 1412 is located at a different position of the guiding groove 1512. In FIG. 8A, the rotating plate 151 has a rotation angle of 0°. In FIG. 8B, the rotational disk 151 has a rotation angle of 90°. Thus, the rotation angle of the rotation adjustment assembly 15 ranges from 0° to 90°. Thereby, by adjusting the rotation angle of the rotary disk 151, horizontal and vertical screen conversions of the display can be realized, so that the viewing angle of the display can be switched at will in different scenarios, so as to provide the user with a better using experience.

In at least one embodiment, referring again to FIG. 7, the rotating plate 151 includes a center zone 1513, a first step portion 1514, and a second step portion 1515. The first step portion 1514 is located around the center zone 1513. The second step portion 1515 is located around the first step portion 1514. The rotation adjustment assembly 15 further includes a shield 153. The shield 153 defines a through hole 1531. A diameter of the through hole 1531 is greater than or equal to a diameter of the center zone 1513. The through hole 1531 has an inner wall adjacent to an outer wall of the first step section 1514. The shield 153 gradually slopes to a side proximate the rotating plate 151 from a center of the shield 153 to an edge of the shield 153.

In at least one embodiment, the shield 153 defines a plurality of heat dissipation holes 1532 for heat dissipation from peripheral elements.

In at least one embodiment, the shield 153 further includes a bent convex edge 1533. The bent convex edge 1533 is adjacent to a periphery of the rotating plate 151 and covers a periphery of the second step portion 1515 far from the first step portion 1514.

Therefore, the shield 153 can cover internal components fully, which can increase aesthetics.

Figure 9:
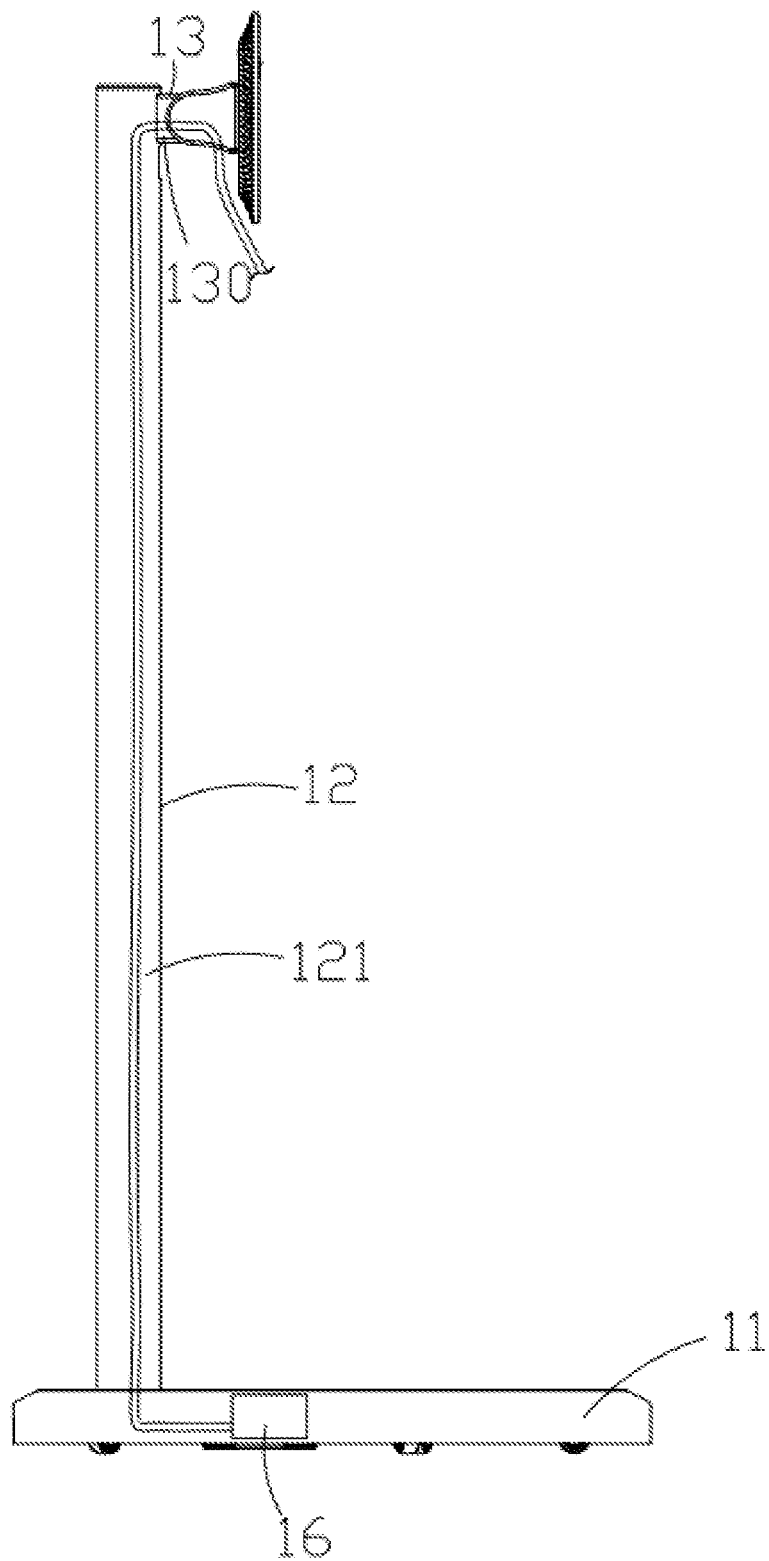
FIG. 9 illustrates a schematic diagram of threading of the mobile bracket in accordance with the first embodiment of the present disclosure.

In at least one embodiment, referring to FIG. 9, the mobile bracket 1 further includes a power supply assembly 16. The power supply assembly 16 is located within the bottom base 11. The power supply assembly 16 may be, but is not limited to, a safety circuit, a transformer circuit, etc. The first supporting rod 12 defines a first threading hole 121. The second supporting rod 13 defines a second threading hole 130. The pitch adjustment assembly 14 defines a third threading hole (not shown). The first threading hole 121, the second threading hole 130 and the third threading hole are internally connected. A wire connected between the power supply assembly 16 and the display connected to the rotation adjustment assembly 15 passes through the first threading hole 121, the second threading hole 130 and the third threading hole. The power supply assembly 16 is configured to be connected to a municipal circuit to supply power to the display which is mounted to the mobile bracket 1.

Therefore, through the first threading hole 121, the second threading hole 130 and the third threading hole, an internal wiring can be realized. The power supply assembly 16 for powering the display is fixed to the bottom base 11. connecting the display through internal wiring can make the mobile bracket 1 appearance more beautiful and simple.

Figure 10:
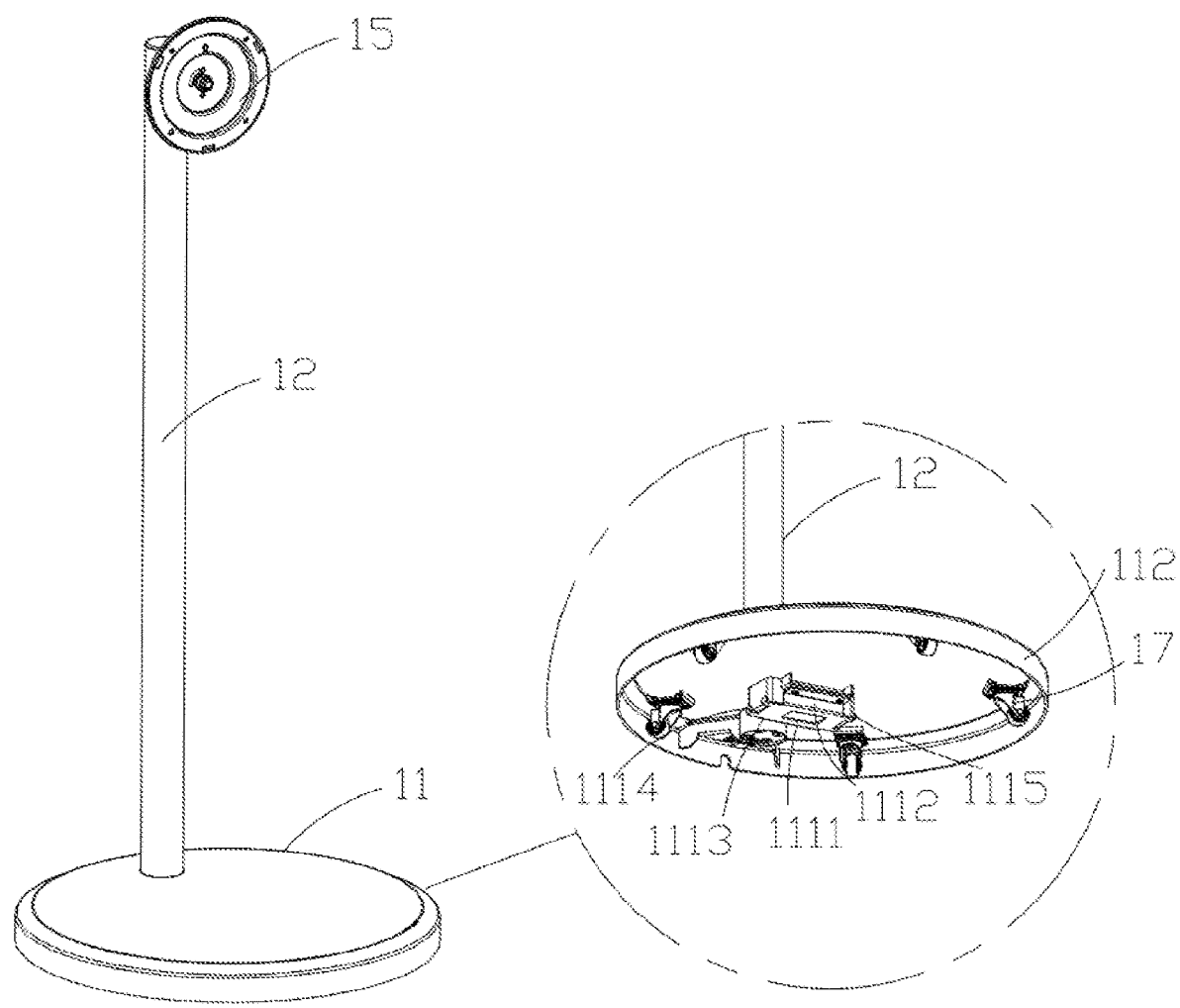
FIG. 10 illustrates a structural schematic diagram of a bottom base of the mobile bracket in accordance with the first embodiment of the present disclosure.

In at least one embodiment, referring to FIG. 10, the mobile bracket 1 further includes a fixing member 111. The fixing member 111 includes a supporting body 1111, a first folding portion 1112 and a second folding portion 1113. The first folding portion 1112 and the second folding portion 1113 are connected to opposite sides of the supporting body 1111. The first folding portion 1112 and the second folding portion 1113 are L-shaped respectively and secured to a lower surface of the bottom base 11. A space between the supporting body 1111, the first folding portion 1112 and the second folding portion 1113 is configured for mounting the power supply assembly 16.

In at least one embodiment, the fixing member 111 further includes a first stopping portion 1114 and a second stopping portion 1115 from opposite additional sides of the supporting body 1111. The first folding portion 1112, the second folding portion 1113, the first stopping portion 1114, and the second stopping portion 1115 respectively limit the power supply assembly 16 from four sides of the power supply assembly 16.

Therefore, the fixing member 111 can securely and reliably fix the power supply assembly 16 to the bottom surface of the bottom base 11. In at least one embodiment, there is a battery mounting position reserved in the bottom base 11, allowing the display to be free from wiring harnesses and to be used anytime, anywhere, and at will.

In at least one embodiment, the mobile bracket 1 further includes at least three roller sets 17. The at least three roller sets 17 are located at different positions on the lower surface of the bottom base 11 and spaced apart from the power supply assembly 16.

Thereby, a rapid movement of the mobile bracket 1 can be realized by the at least three roller sets 17.

In at least one embodiment, the mobile bracket 1 further includes a shielding ring 112. The shielding ring 112 is bent downwardly from a periphery of the bottom base 11. A distance between a bottom end of the shielding ring 112 and a ground is smaller than a distance between the bottom base 11 and the ground.

Therefore, the at least three roller sets 17 can be obscured by the shielding ring 112, and the at least three roller sets 17 cannot be seen from the outside from a user's view, which can make the mobile bracket 1 more aesthetically pleasing and simple. The shielding ring 112 is almost near the ground, which can not only keep the mobile bracket 1 moving by using the at least three roller sets 17 but also ensure the aesthetics of the mobile bracket 1.

In at least one embodiment, a beveled edge design is configured between the bottom base 11 and the shielding ring 112, which can make the product appearance more beautiful and neat.

It can be understood that in the first embodiment, the height of the first supporting rod 12 remains constant, i.e., the height of the first supporting rod 12 cannot be adjusted.

Figure 11:
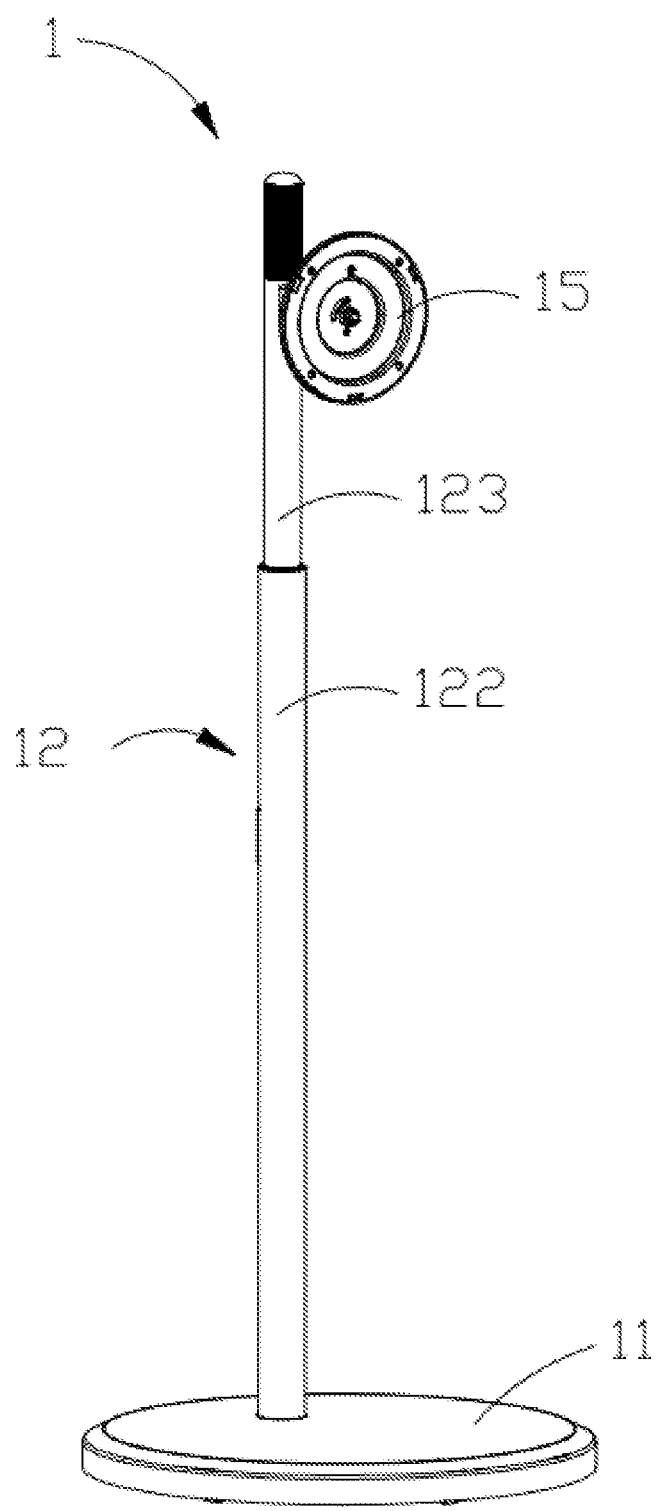
FIG. 11 illustrates a three-dimensional structural schematic diagram of the mobile bracket in accordance with a second embodiment of the present disclosure.
Figure 12:
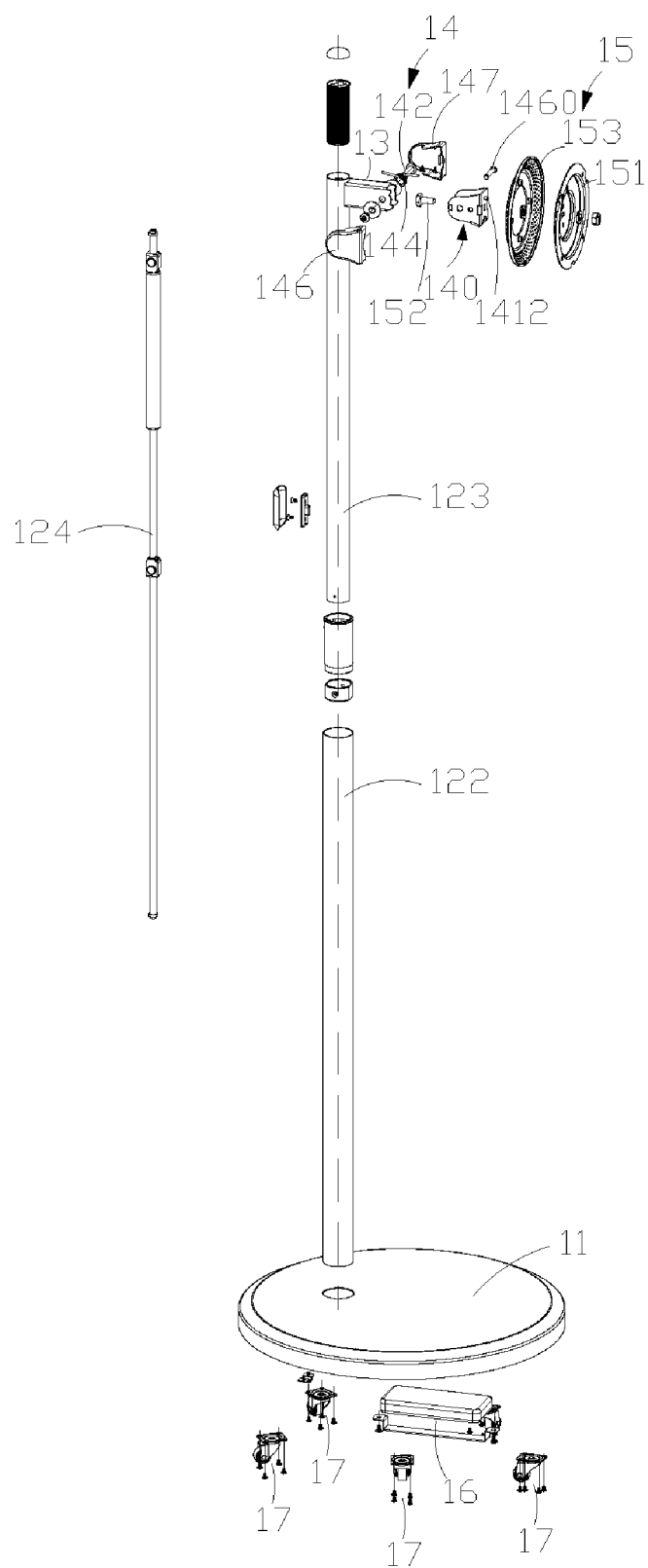
FIG. 12 illustrates an exploded diagram of FIG. 11.
Figure 13:
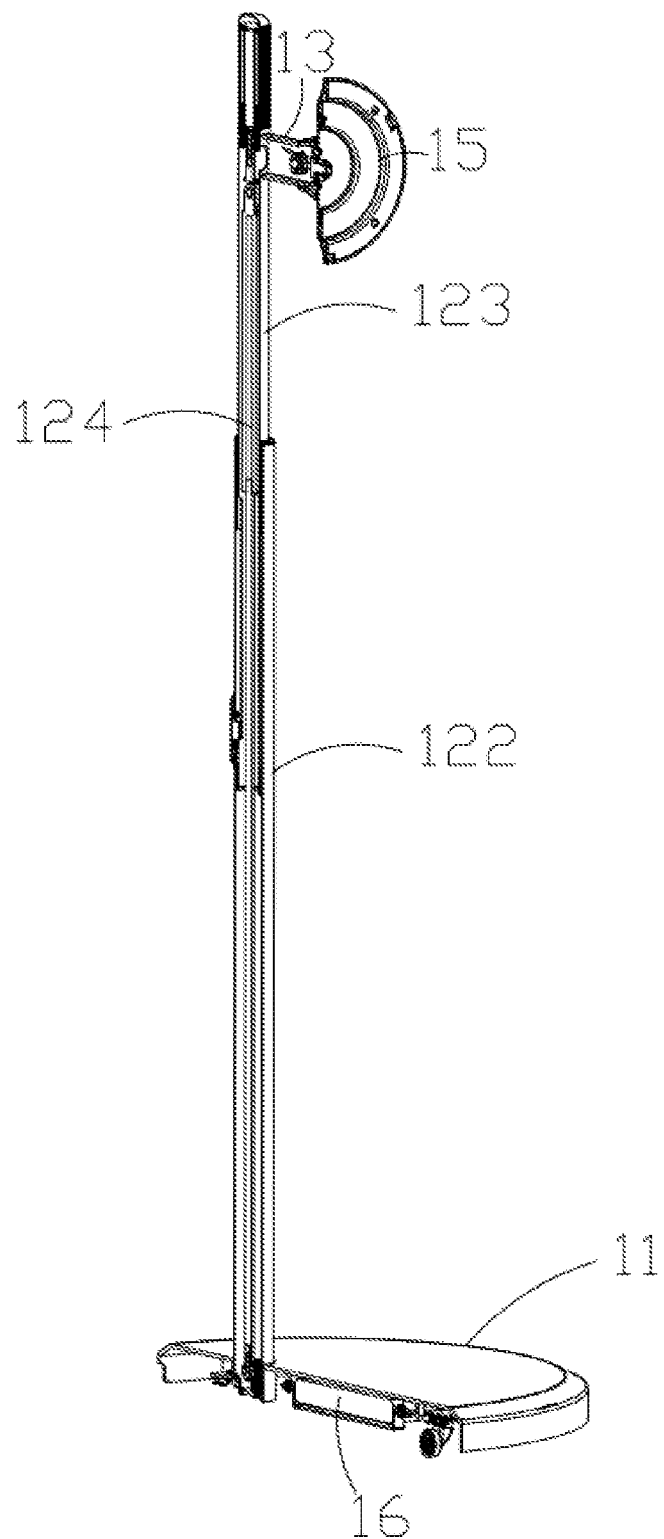
FIG. 13 illustrates a cross-sectional three-dimensional schematic diagram of the mobile bracket in accordance with the second embodiment of the present disclosure.
Figure 14:
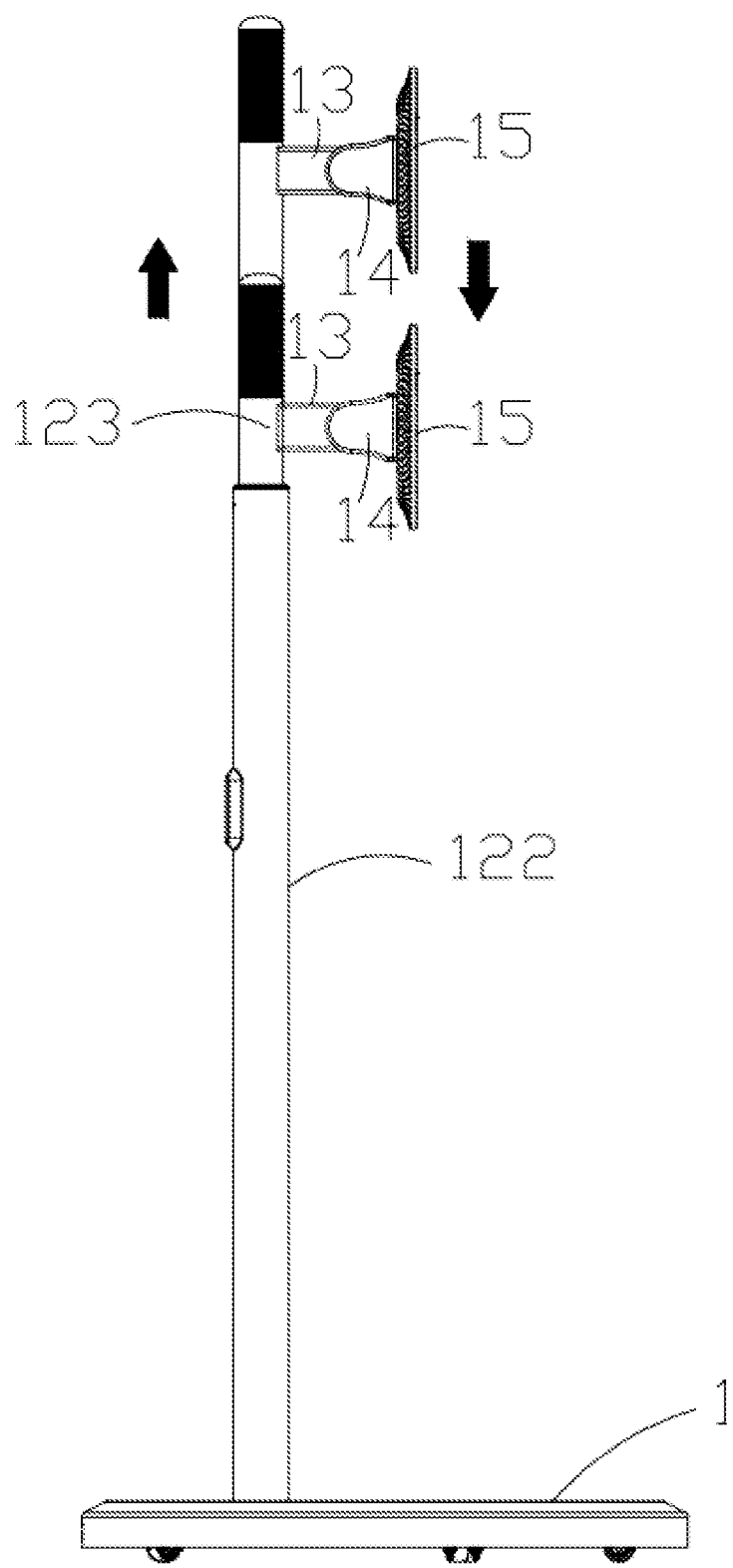
FIG. 14 illustrates a schematic diagram of height adjustment of the mobile bracket in accordance with the second embodiment of the present disclosure.
Figure 15:
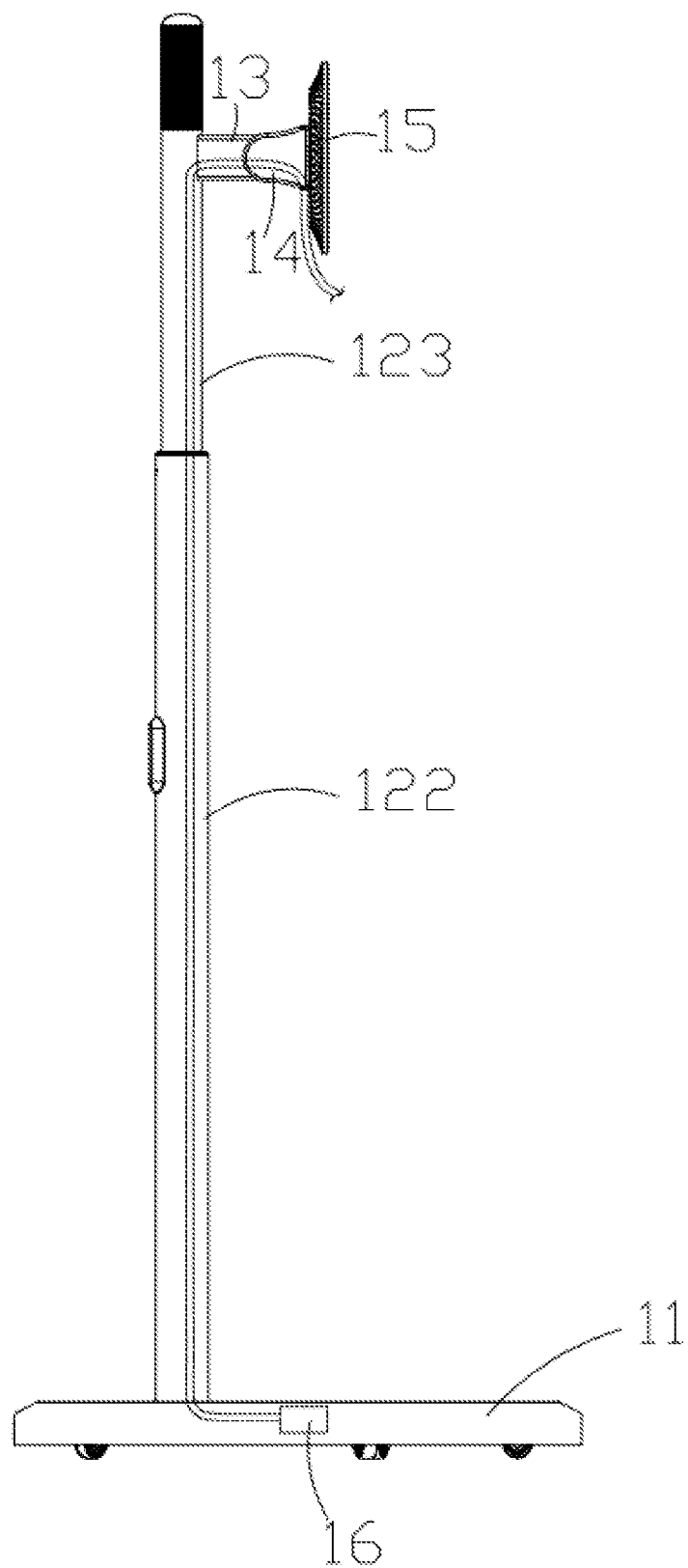
FIG. 15 illustrates a schematic diagram of threading of the mobile bracket in accordance with the second embodiment of the present disclosure.
Figure 16:
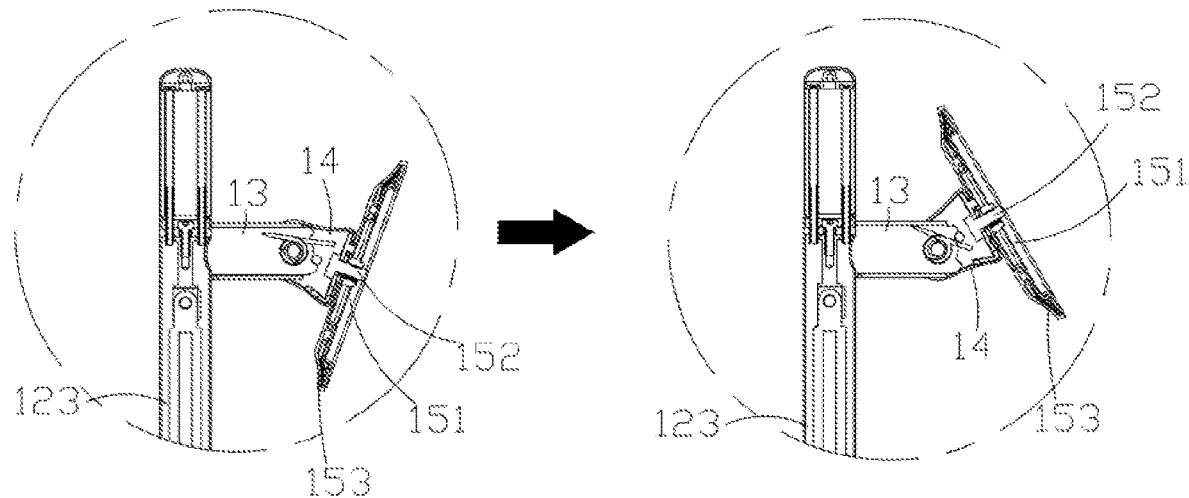
FIG. 16 illustrates a schematic diagram of pitch angle adjustment of the mobile bracket in accordance with the second embodiment of the present disclosure.
Figure 17:
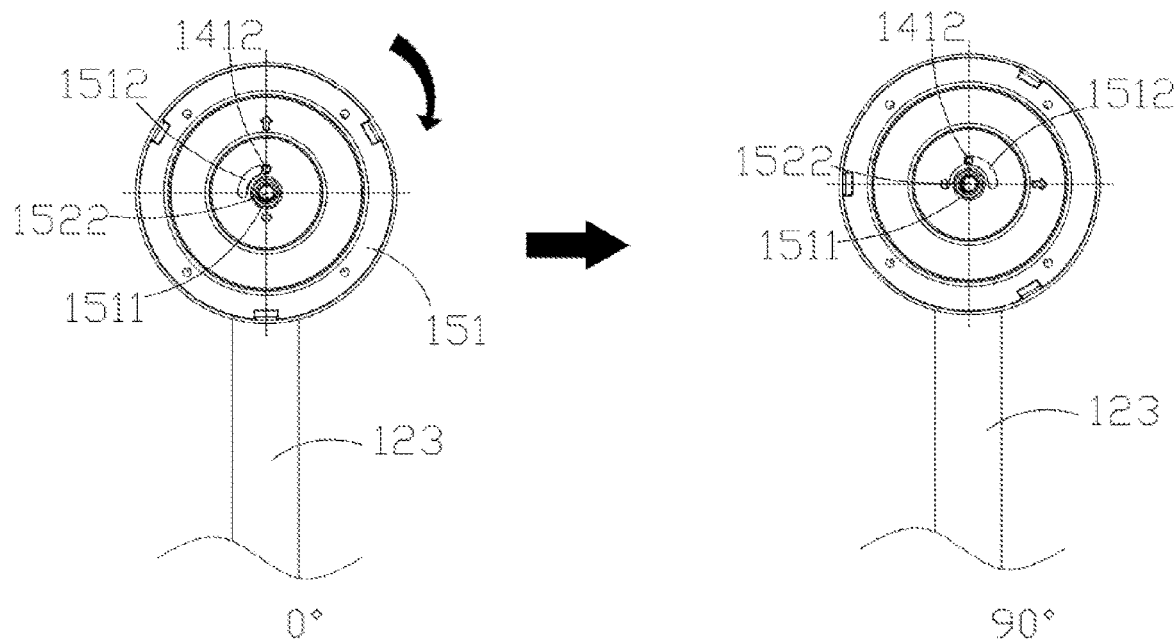
FIG. 17 illustrates a schematic diagram of rotation angle adjustment of the mobile bracket in accordance with the second embodiment of the present disclosure.
Figure 18:
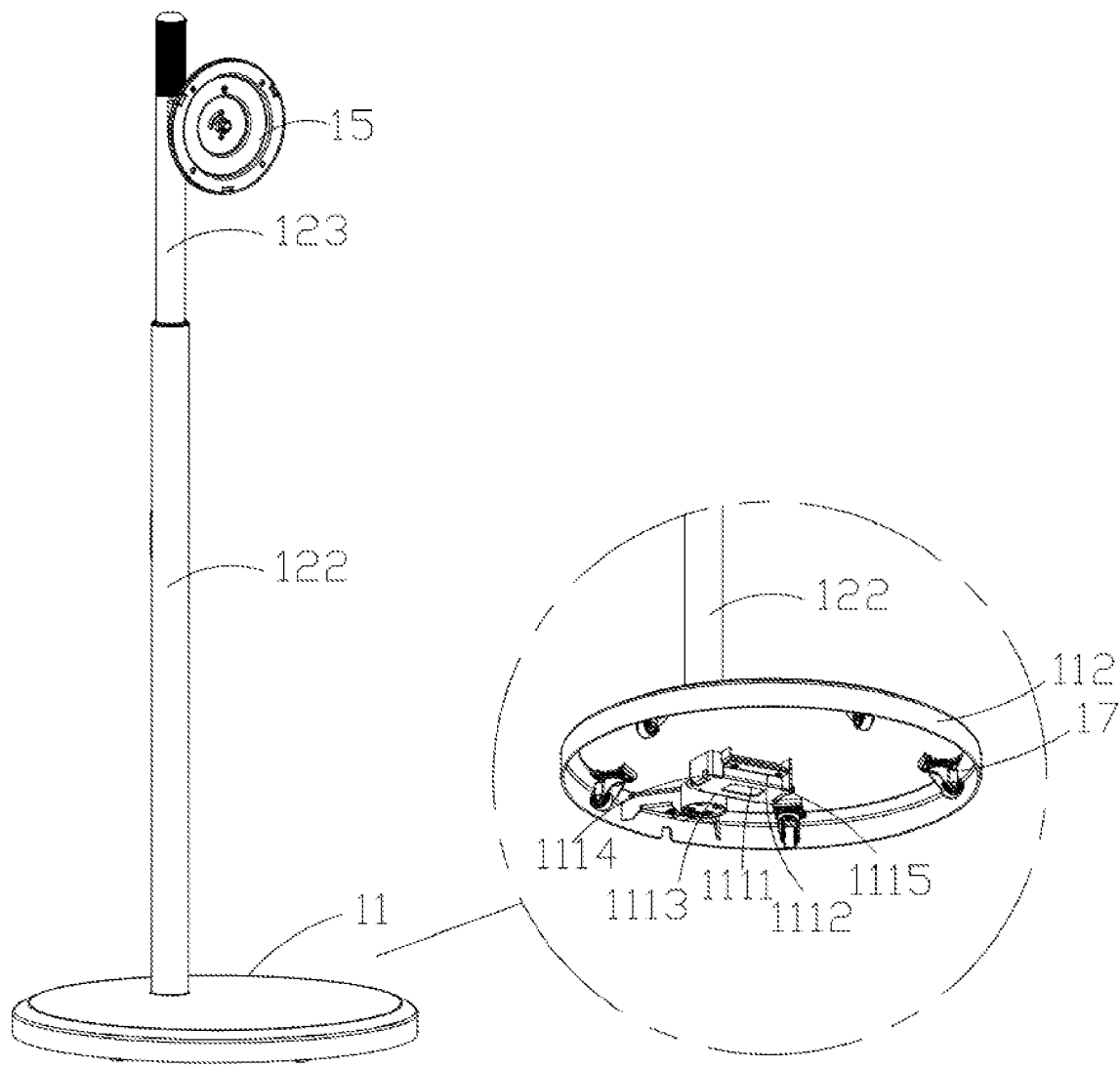
FIG. 18 illustrates a structural schematic diagram of a bottom base of the mobile bracket in accordance with the second embodiment of the present disclosure.
Figure 19:
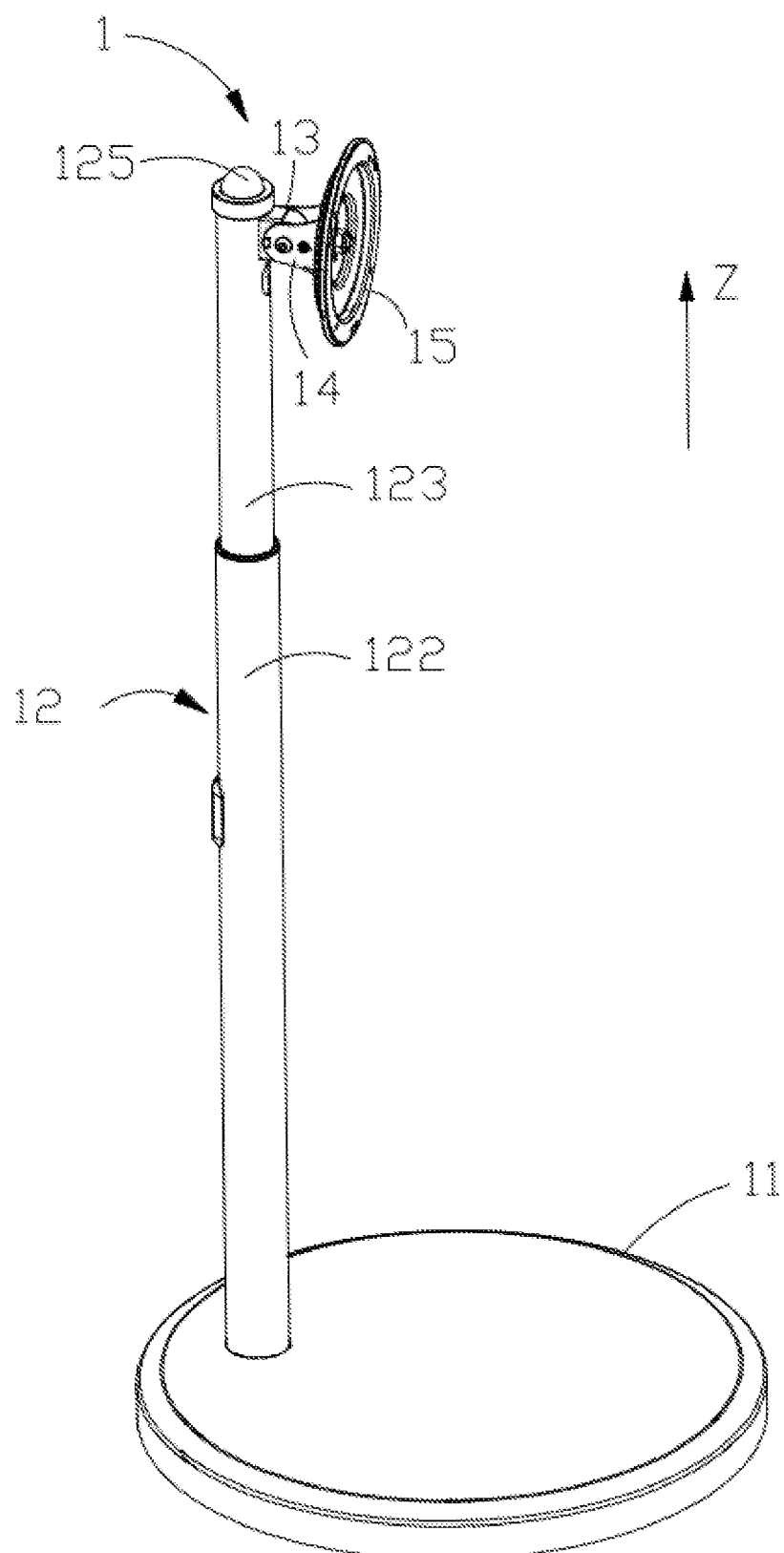
FIG. 19 illustrates a three-dimensional structural schematic diagram of the mobile bracket in accordance with a third embodiment of the present disclosure.

Referring together to FIGS. 11 to 18, FIG. 11 illustrates a three-dimensional structural schematic diagram of the mobile bracket in accordance with a second embodiment of the present disclosure; FIG. 12 illustrates an exploded diagram of FIG. 11; FIG. 13 illustrates a cross-sectional three-dimensional schematic diagram of the mobile bracket in accordance with the second embodiment of the present disclosure; FIG. 14 illustrates a schematic diagram of height adjustment of the mobile bracket in accordance with the second embodiment of the present disclosure; FIG. 15 illustrates a schematic diagram of threading of the mobile bracket in accordance with the second embodiment of the present disclosure; FIG. 16 illustrates a schematic diagram of pitch angle adjustment of the mobile bracket in accordance with the second embodiment of the present disclosure; FIG. 17 illustrates a schematic diagram of rotation angle adjustment of the mobile bracket in accordance with the second embodiment of the present disclosure; FIG. 18 illustrates a structural schematic diagram of a bottom base of the mobile bracket in accordance with the second embodiment of the present disclosure. The mobile bracket 1 in the second embodiment is structurally similar to the mobile bracket 1 in the first embodiment, with the difference that the height of the first supporting rod 12 of the mobile bracket 1 in the second embodiment is adjustable.

As shown in FIGS. 11 and 12, the first supporting rod 12 includes a supporting arm 122, a lifting arm 123, and a height adjustment member 124. The lifting arm 123 is inserted at one end of the supporting arm 122 far from the bottom base 11. The height adjusting member 124 is located within the supporting arm 122 and the lifting arm 123. The height adjusting member 124 adjusts a protruding length of the lifting arm 123 relative to the supporting arm 122 to adjust a total height between the supporting arm 122 and the lifting arm 123.

Referring to FIG. 12, in the second embodiment, the height adjusting member 124 is a damping gas spring, which can be stopped at any position in travel without any external structure. The damping gas spring is a constant force gas spring, i.e., it can only withstand a preset weight, for example, when the factory pressure of the damping gas spring is set to 5 KG, the mobile bracket 1 can only be fitted with a display having a weight of 5 KG. For another example, when the factory pressure of the damping gas spring is set to 3 KG, the mobile bracket 1 can only be fitted with a display having a weight of 3 KG.

Thus, by using the damping gas spring, the lifting arm 123 can be fixed at any height at any time to meet the user's needs, so that the mobile bracket 1 can be adapted to a wider range of display sizes.

Figure 20:
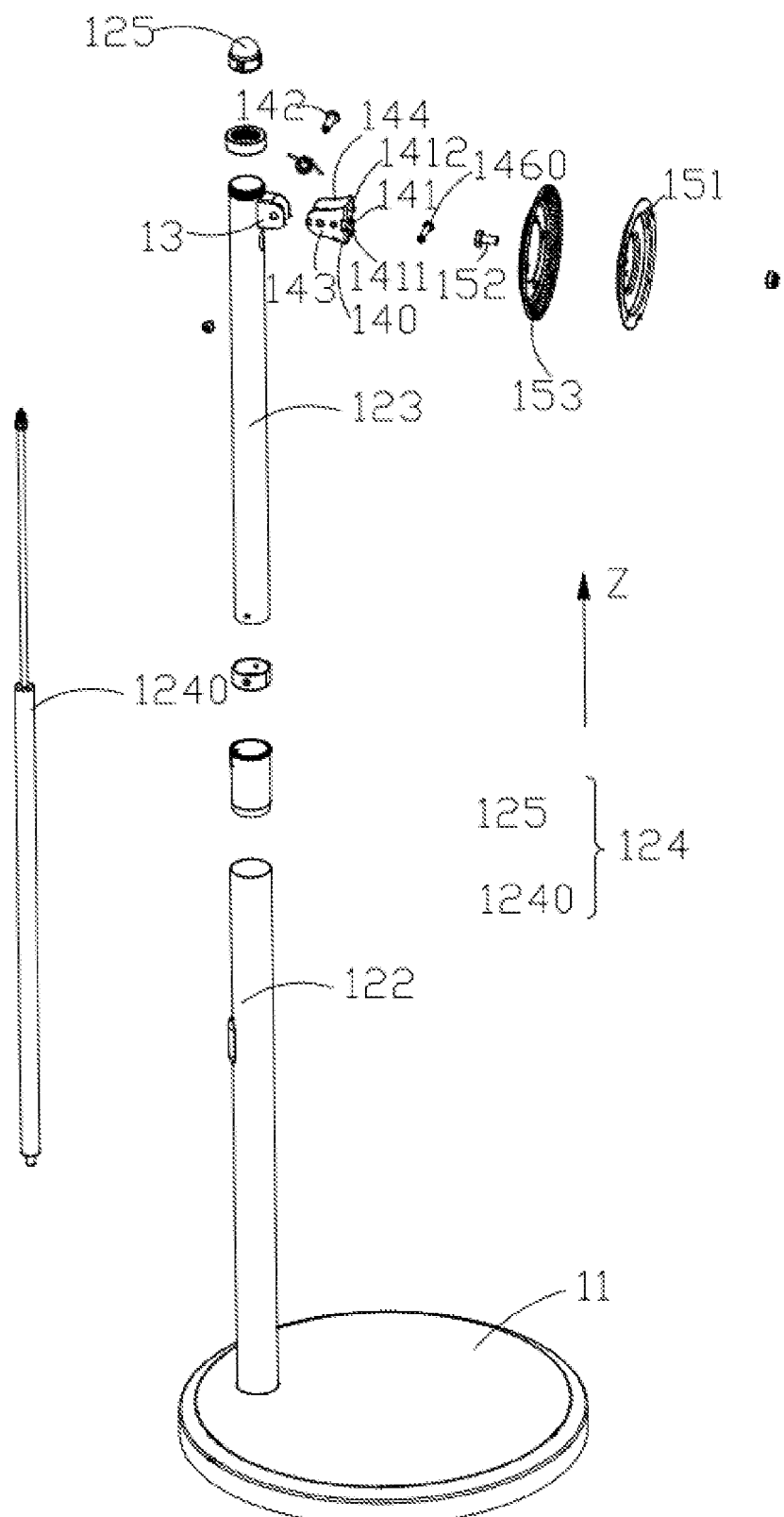
FIG. 20 illustrates an exploded diagram of FIG. 19.
Figure 21:
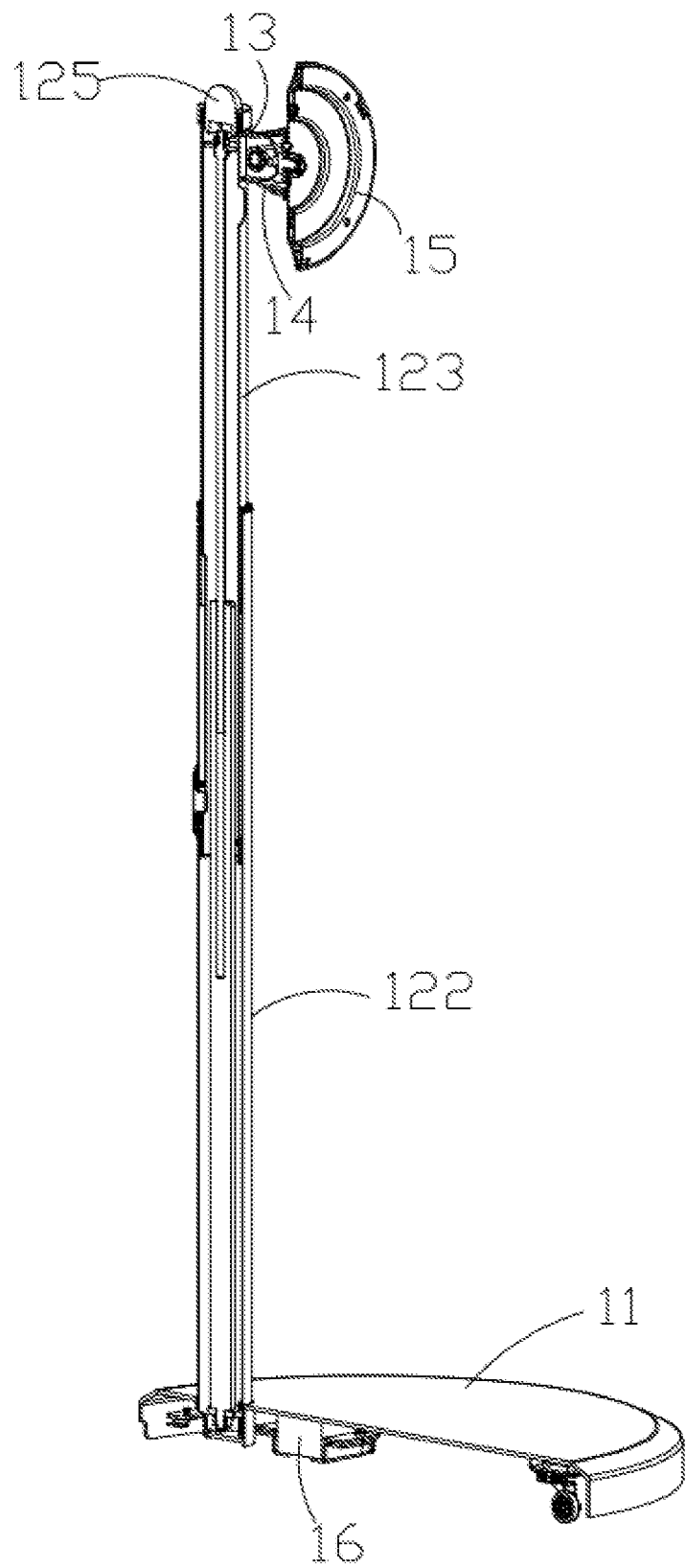
FIG. 21 illustrates a cross-sectional three-dimensional schematic diagram of the mobile bracket in accordance with a third embodiment of the present disclosure.
Figure 22:
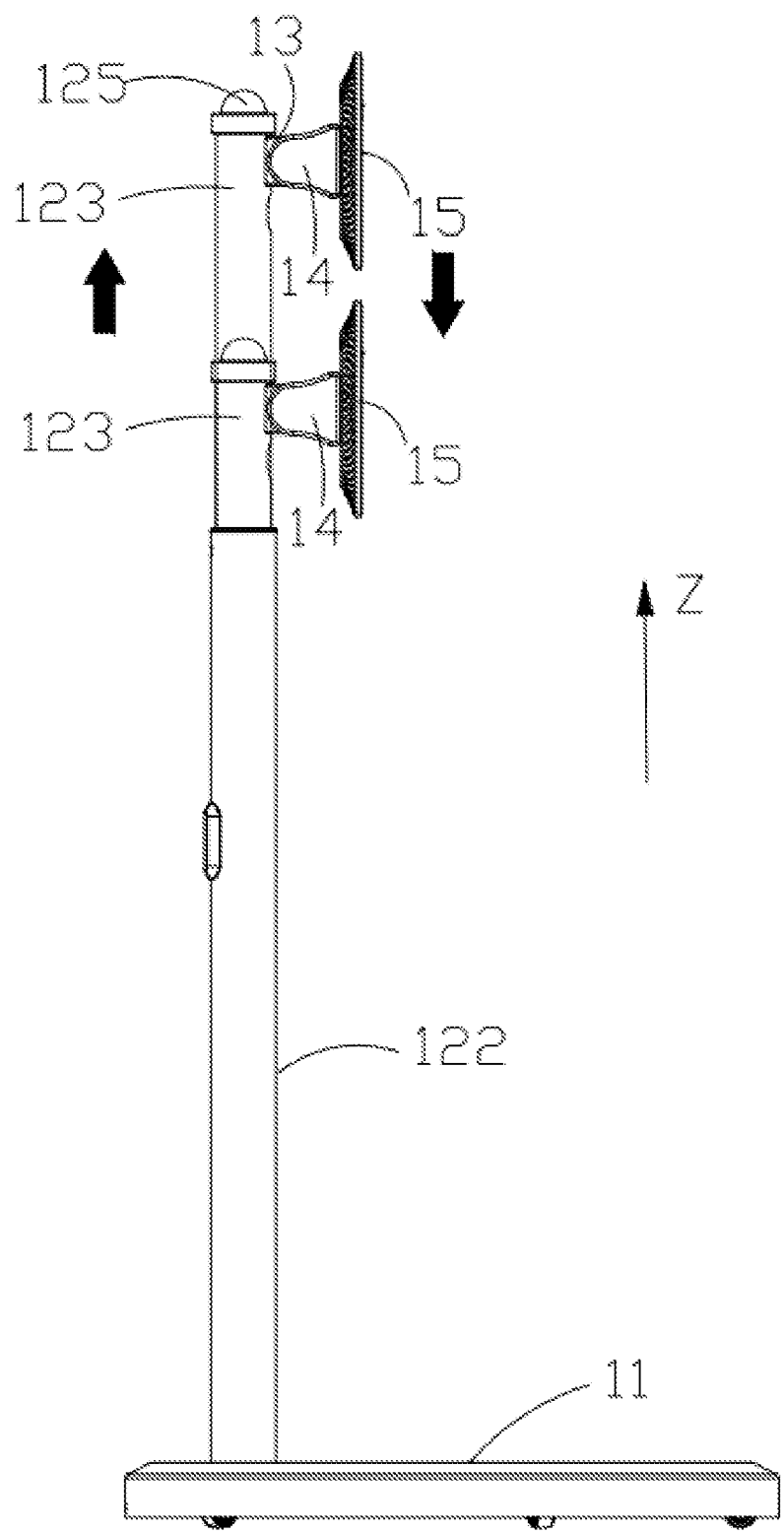
FIG. 22 illustrates a schematic diagram of height adjustment of the mobile bracket in accordance with the third embodiment of the present disclosure.
Figure 23:
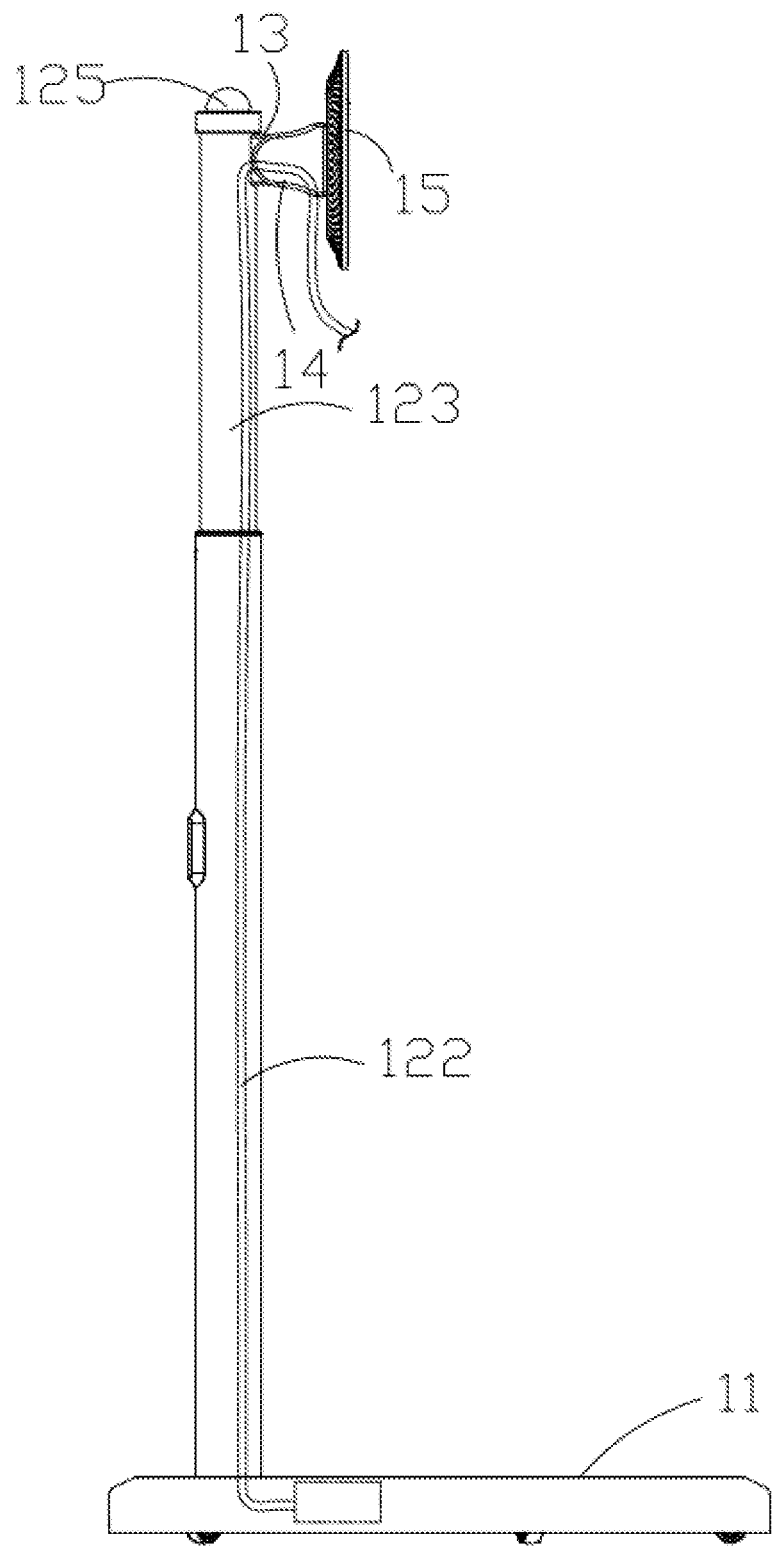
FIG. 23 illustrates a schematic diagram of threading of the mobile bracket in accordance with the third embodiment of the present disclosure.
Figure 24:
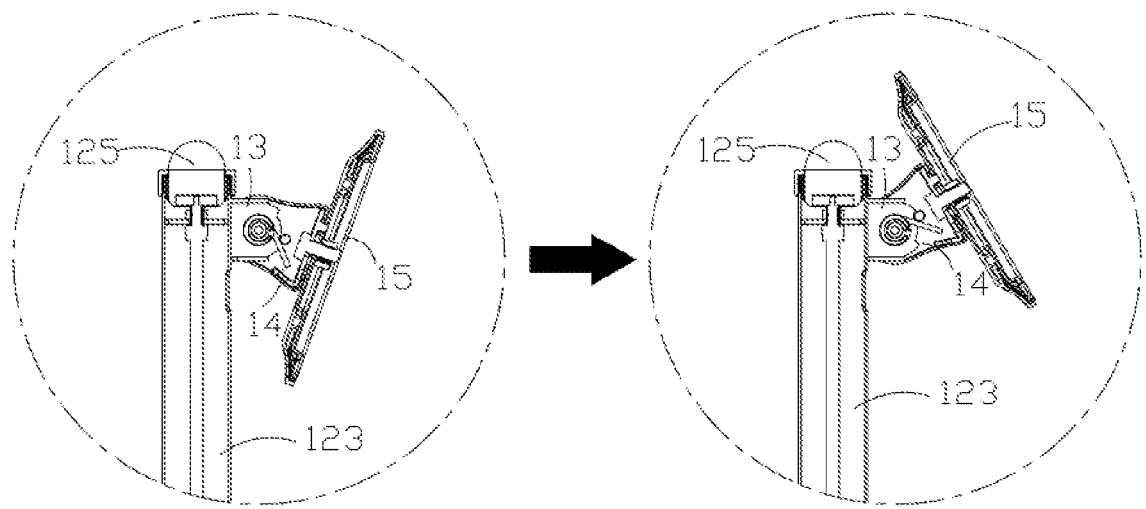
FIG. 24 illustrates a schematic diagram of pitch angle adjustment of the mobile bracket in accordance with the third embodiment of the present disclosure.
Figure 25:
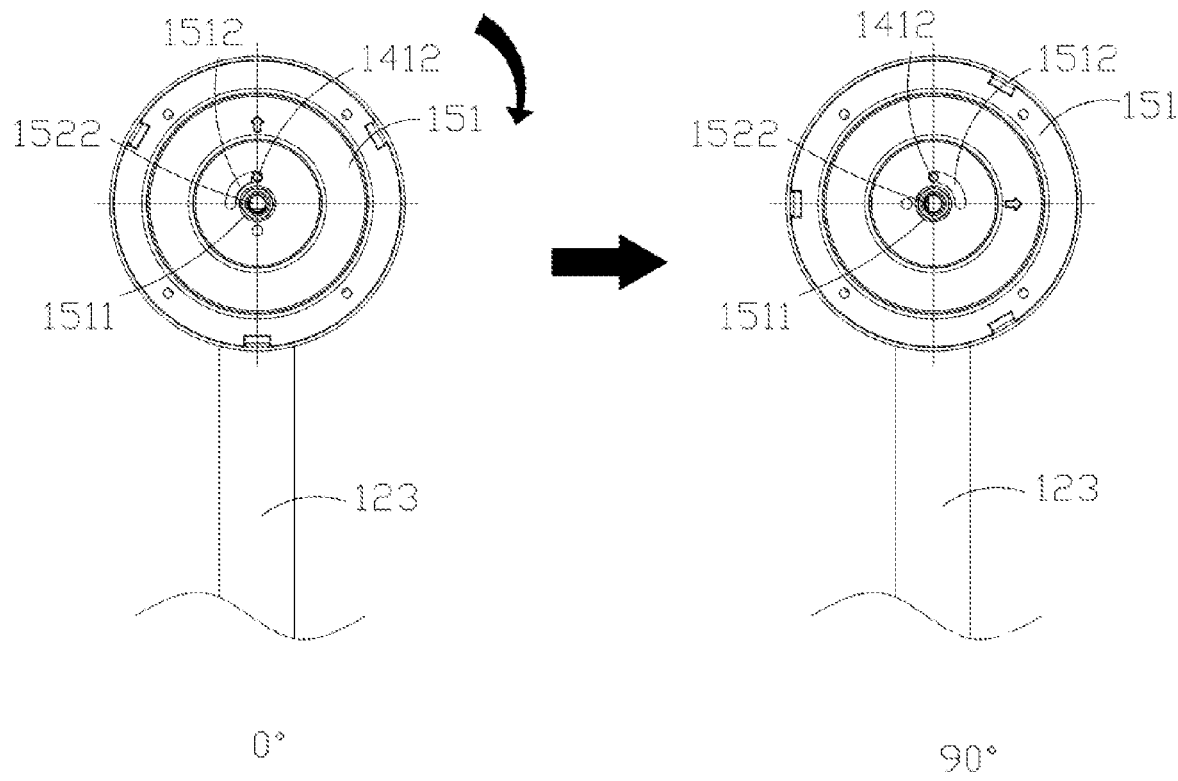
FIG. 25 illustrates a schematic diagram of rotation angle adjustment of the mobile bracket in accordance with the third embodiment of the present disclosure.
Figure 26:
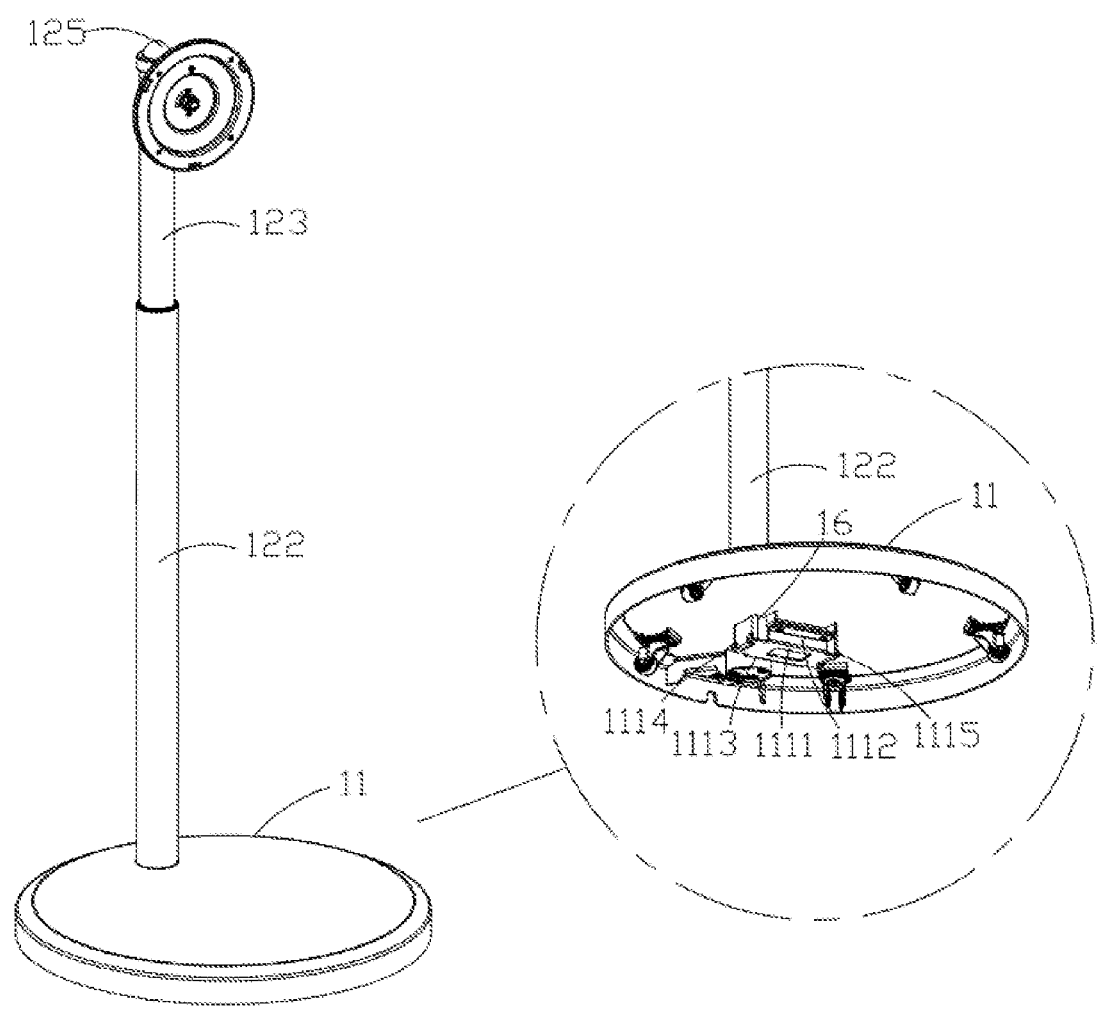
FIG. 26 illustrates a schematic diagram of a bottom case of the mobile bracket in accordance with the third embodiment of the present disclosure.
Figure 27:
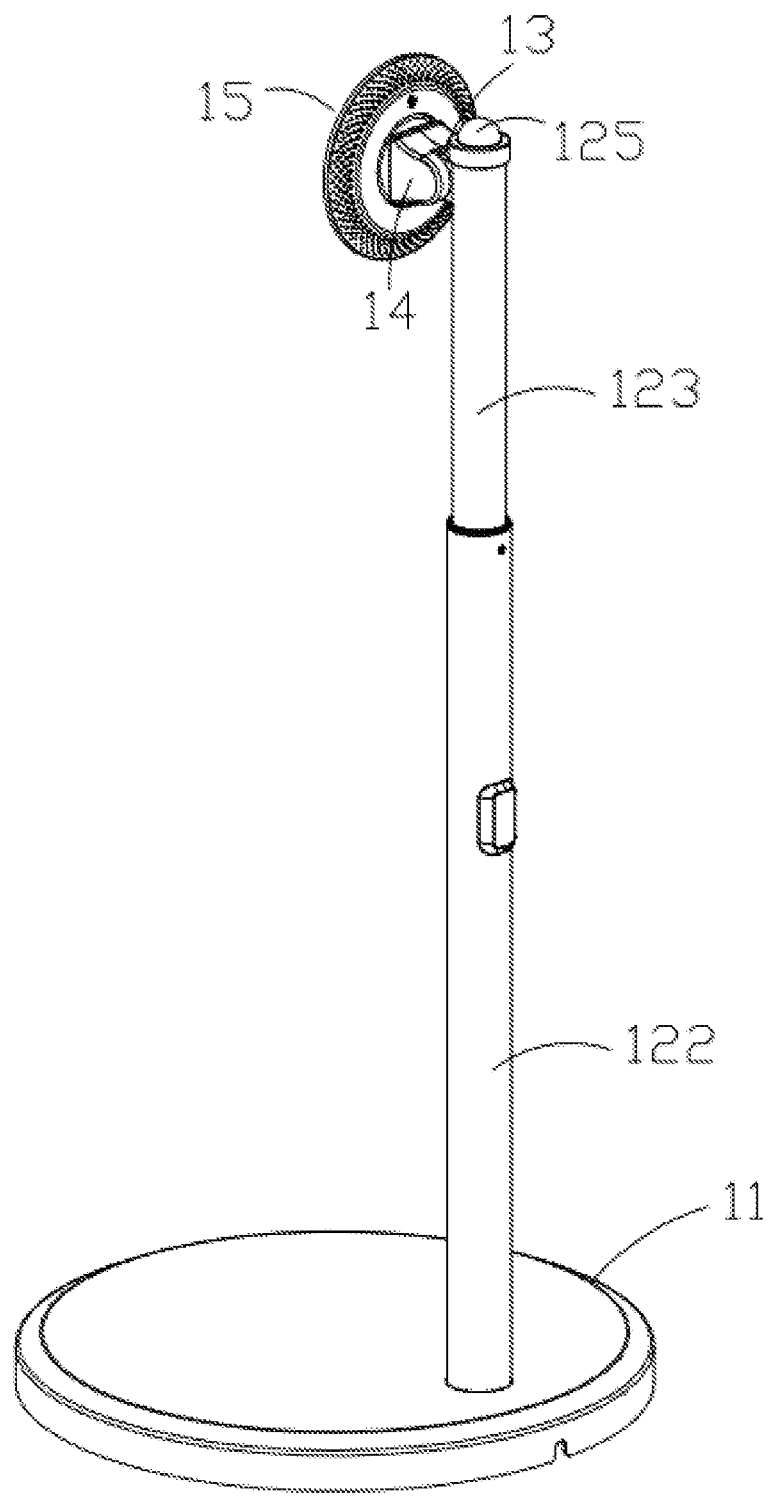
FIG. 27 illustrates a three-dimensional structural schematic diagram of the mobile bracket from another view in accordance with the third embodiment of the present disclosure.
Figure 28:
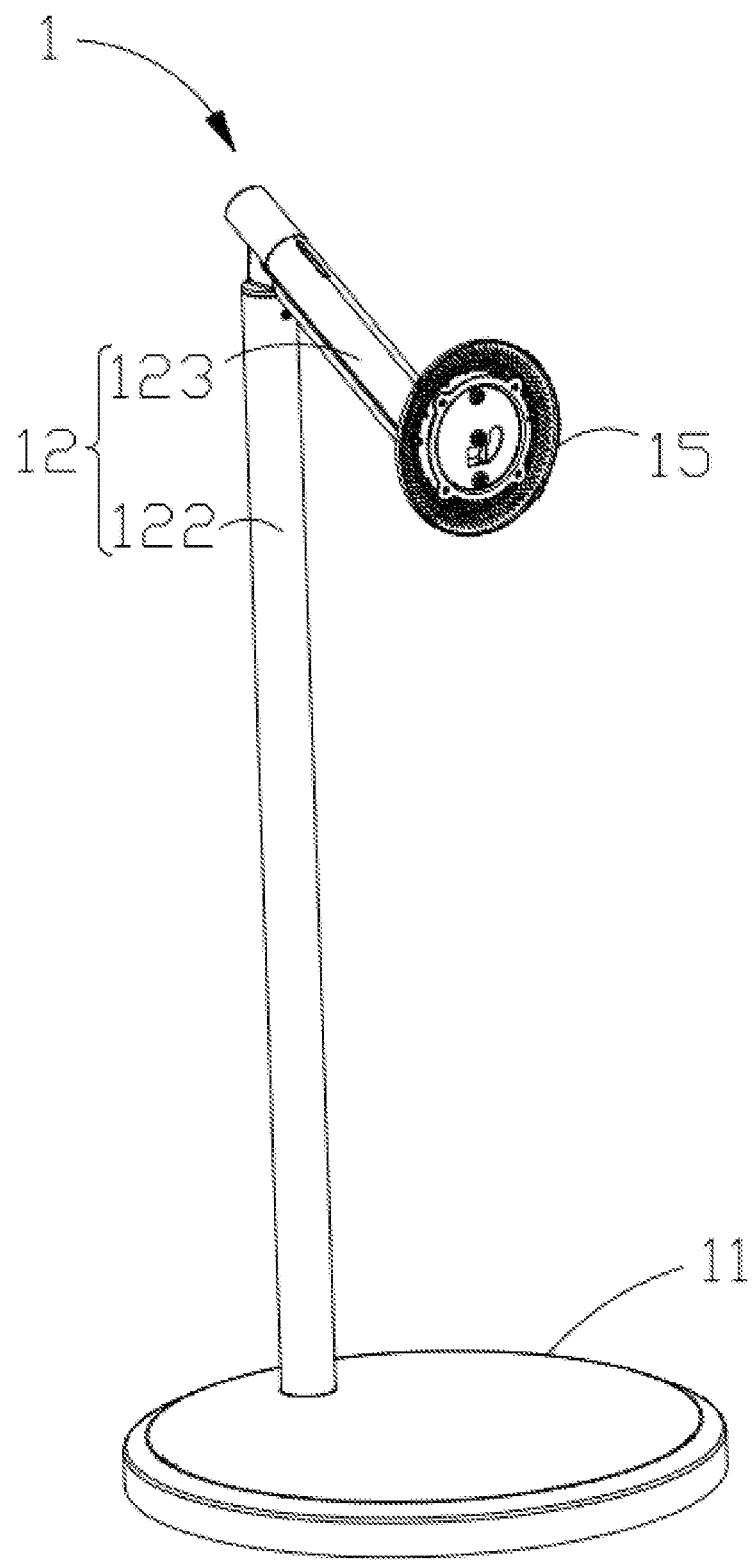
FIG. 28 illustrates a three-dimensional structural schematic diagram of the mobile bracket from one view in accordance with a fourth embodiment of the present disclosure.

Referring to FIGS. 19 to 27, FIG. 19 illustrates a three-dimensional structural schematic diagram of the mobile bracket in accordance with a third embodiment of the present disclosure; FIG. 20 illustrates an exploded diagram of FIG. 19; FIG. 21 illustrates a cross-sectional three-dimensional schematic diagram of the mobile bracket in accordance with a third embodiment of the present disclosure; FIG. 22 illustrates a schematic diagram of height adjustment of the mobile bracket in accordance with the third embodiment of the present disclosure; FIG. 23 illustrates a schematic diagram of threading of the mobile bracket in accordance with the third embodiment of the present disclosure; FIG. 24 illustrates a schematic diagram of pitch angle adjustment of the mobile bracket in accordance with the third embodiment of the present disclosure; FIG. 25 illustrates a schematic diagram of rotation angle adjustment of the mobile bracket in accordance with the third embodiment of the present disclosure; FIG. 26 illustrates a schematic diagram of a bottom case of the mobile bracket in accordance with the third embodiment of the present disclosure; FIG. 27 illustrates a three-dimensional structural schematic diagram of the mobile bracket from another view in accordance with the third embodiment of the present disclosure. The mobile bracket 1 in the third embodiment is structurally similar to the mobile bracket 1 in the first embodiment, with the difference that the height of the first supporting rod 12 of the mobile bracket 1 in the third embodiment is adjustable.

As shown in FIG. 20, the height adjusting member 124 is a self-locking gas spring. The self-locking gas spring can be stopped at any position in a travel with an aid of a release mechanism, and has a large locking force (which can be more than 10,000 N) after stopping. It can be understood that the self-locking gas spring can have different load-bearing capacities: in different application scenarios, the self-locking gas spring 1240 can be selected for different load-bearing capacities according to demands. Specifically, in the third embodiment, the height adjusting member 124 includes a self-locking gas spring 1240 and a control button 125. The control button 125 is the release mechanism. The self-locking gas spring 1240 is located within the supporting arm 122 and the lifting arm 123. The control button 125 is connected to one end of the lifting arm 123 far from the supporting arm 122 and pressed against the self-locking gas spring 1240. When the control button 125 is pressed, the height adjustment function of the self-locking gas spring 1240 can be unlocked, thereby enabling adjustment of a height of the lifting arm 123 protruding from the supporting arm 122 by lifting the lifting arm 123 upwardly or pressing the lifting arm 123 downwardly to adjust a protruding height of the lifting arm 123 relative to the supporting arm 122. When the control button 125 is released, the height adjustment function of the self-locking gas spring 1240) can be locked, at which time the height of the lifting arm 123 relative to the supporting arm 122 cannot be adjusted. Therefore, to adjust the height of the lifting arm 123 relative to the supporting arm 122, it is necessary to keep pressing the control button 125 until the height of the lifting arm 123 relative to the supporting arm 122 is adjusted to a desired height, and then release the control button 125 to lock the height adjustment function of the self-locking gas spring 1240 again. The self-locking gas spring 1240 can be adapted to displays with different weights. For example, when the maximum load bearing capacity of the mobile bracket 1 is 15 KG, then the displays of any weight up to 15 KG are suitable for the mobile bracket 1, and the height adjustment requires continuous pressing of the control button 125 to unlock the self-locking gas spring, before the height adjustment can be realized.

Thereby, by controlling the lifting and lowering of the self-locking gas spring 1240 via the control button 125, the total height between the supporting arm 122 and the lifting arm 123 can be adjusted at any time, so that the mobile bracket 1 can be adapted to fit a wider range of dimensions of the display.

Due to the cooperation of the torsion spring 145 and the limiting rod 1460, the mobile bracket 1 of the first embodiment, the second embodiment and the third embodiment can counteract a tendency to rotate downward due to the gravity of the display, and the adjustment of the angle of the upward tilt and the downward tilt is more labor-saving.

Figure 29:
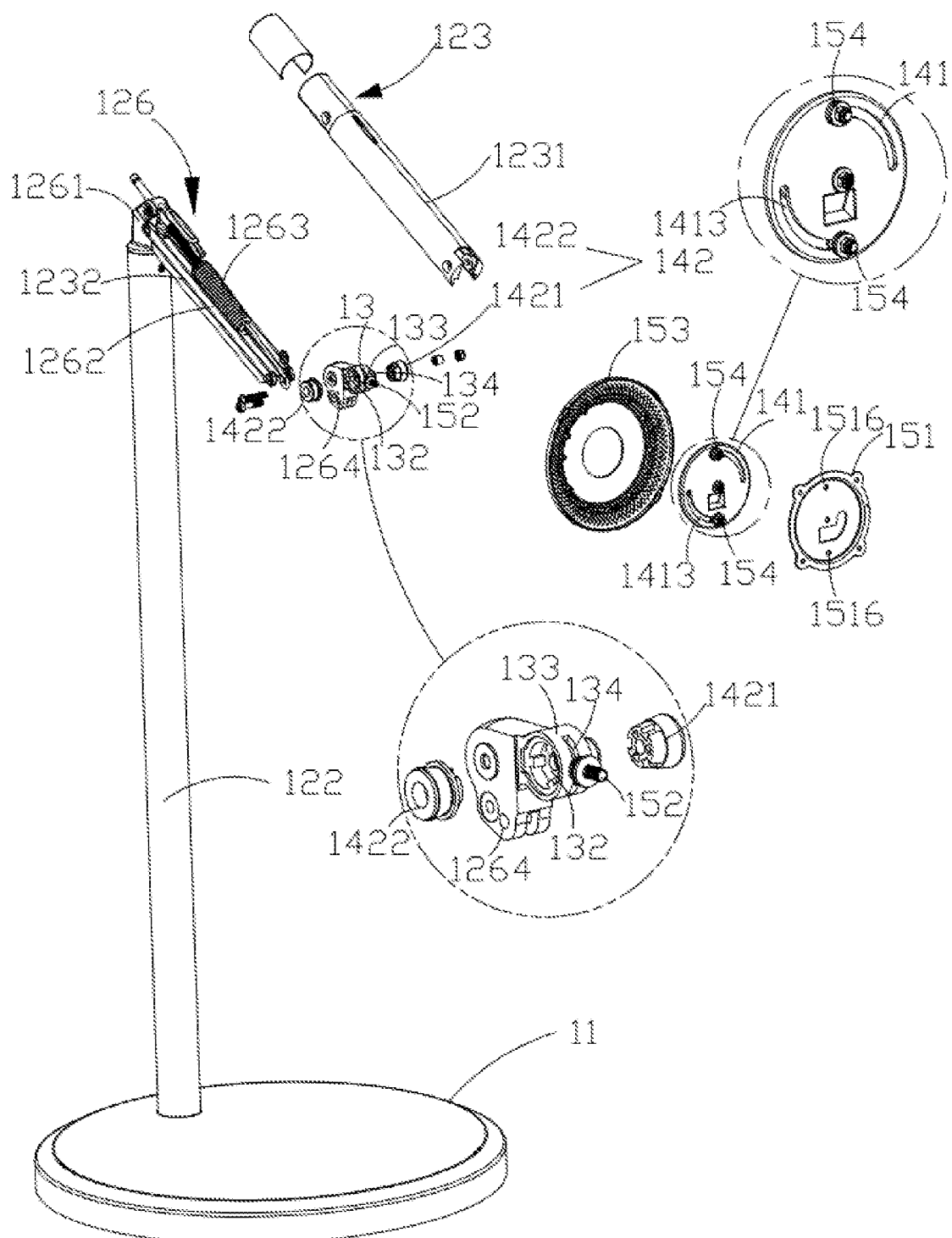
FIG. 29 illustrates an exploded diagram of FIG. 28.
Figure 30:
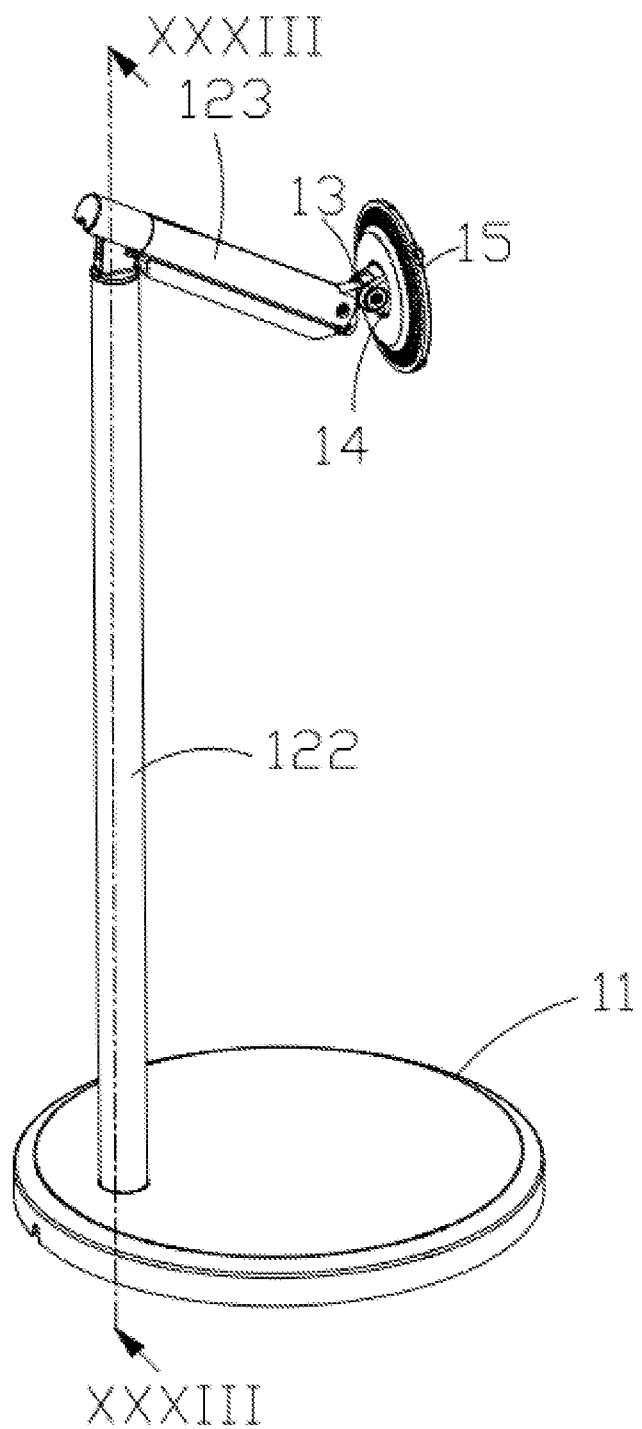
FIG. 30 illustrates a three-dimensional structural schematic diagram of the mobile bracket from another view in accordance with the fourth embodiment of the present disclosure.
Figure 31:
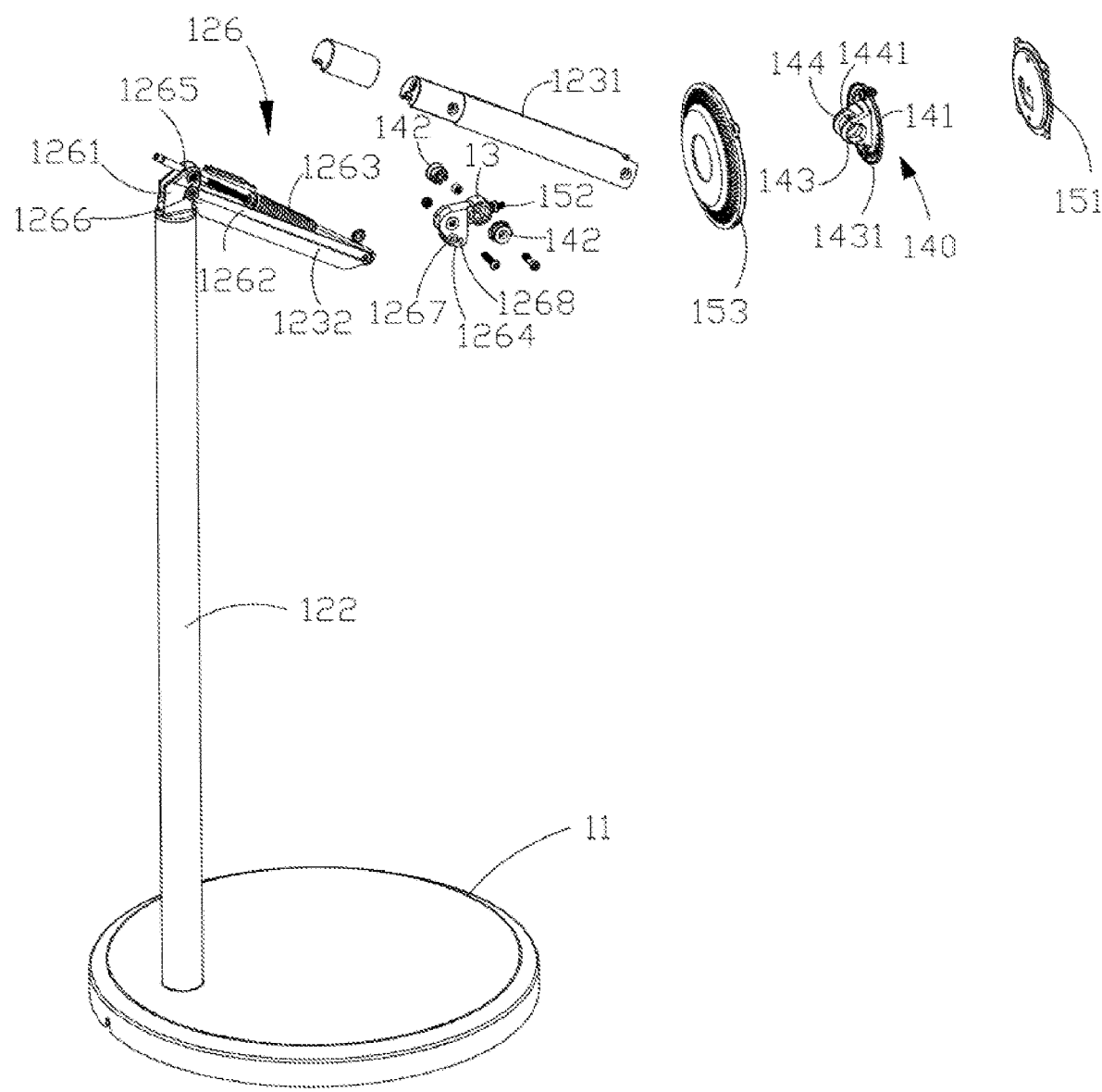
FIG. 31 illustrates an exploded diagram of FIG. 30.
Figure 32:
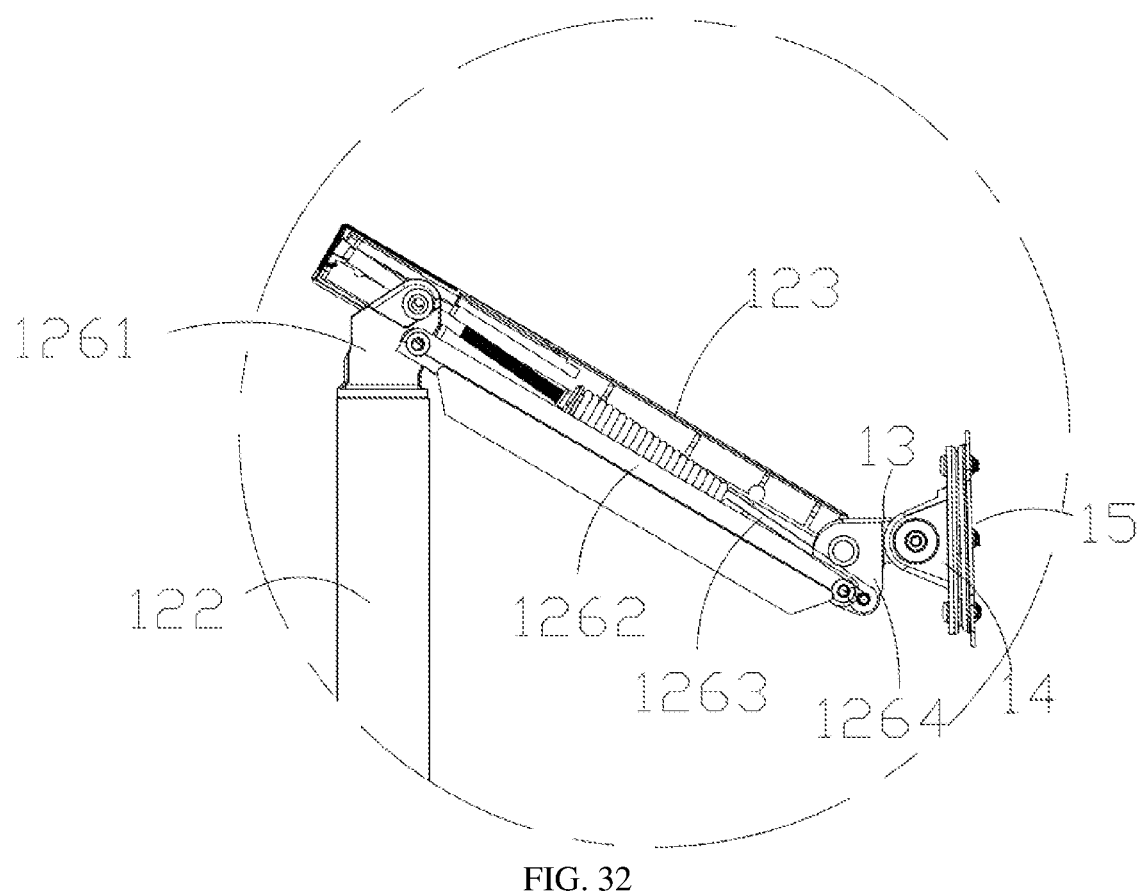
FIG. 32 illustrates a schematic diagram of an internal structure of a lifting arm after partial shell is removed in accordance with a fourth embodiment of the present disclosure.
Figure 33:
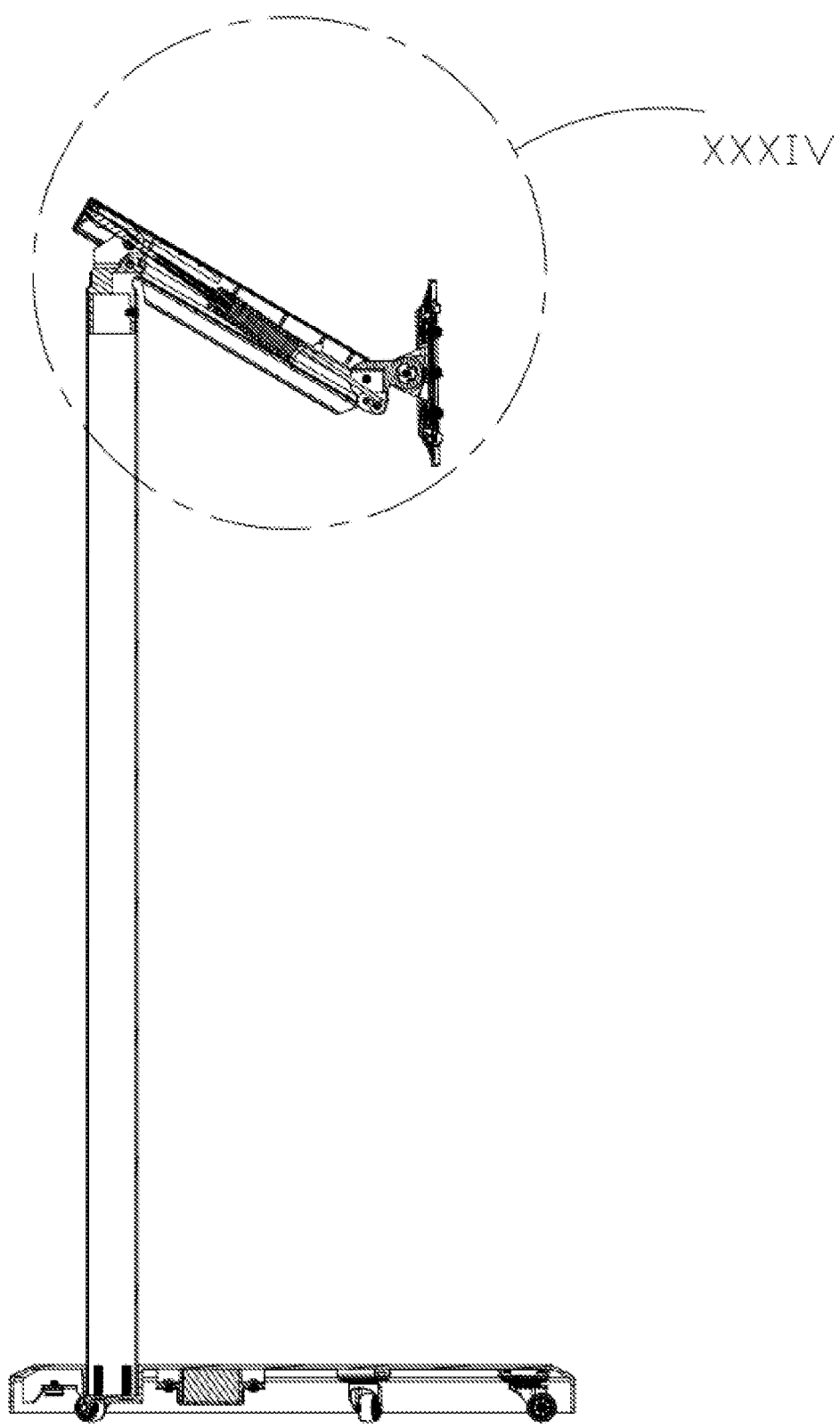
FIG. 33 illustrates a cross-sectional three-dimensional schematic diagram of FIG. 30 at XXXIII.
Figure 34:
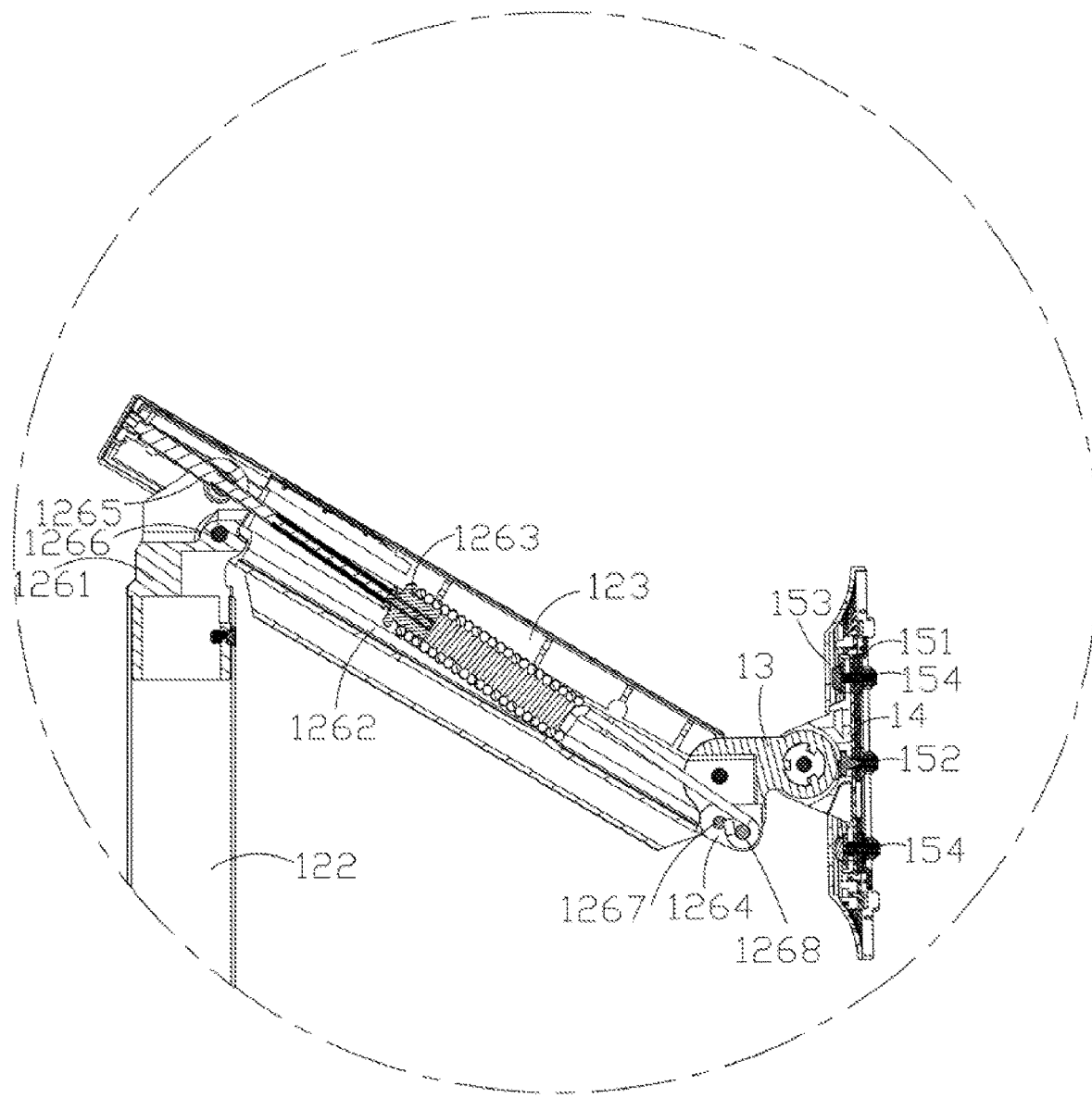
FIG. 34 illustrates a partially enlarged view of FIG. 33 at XXXIV.
Figure 35:
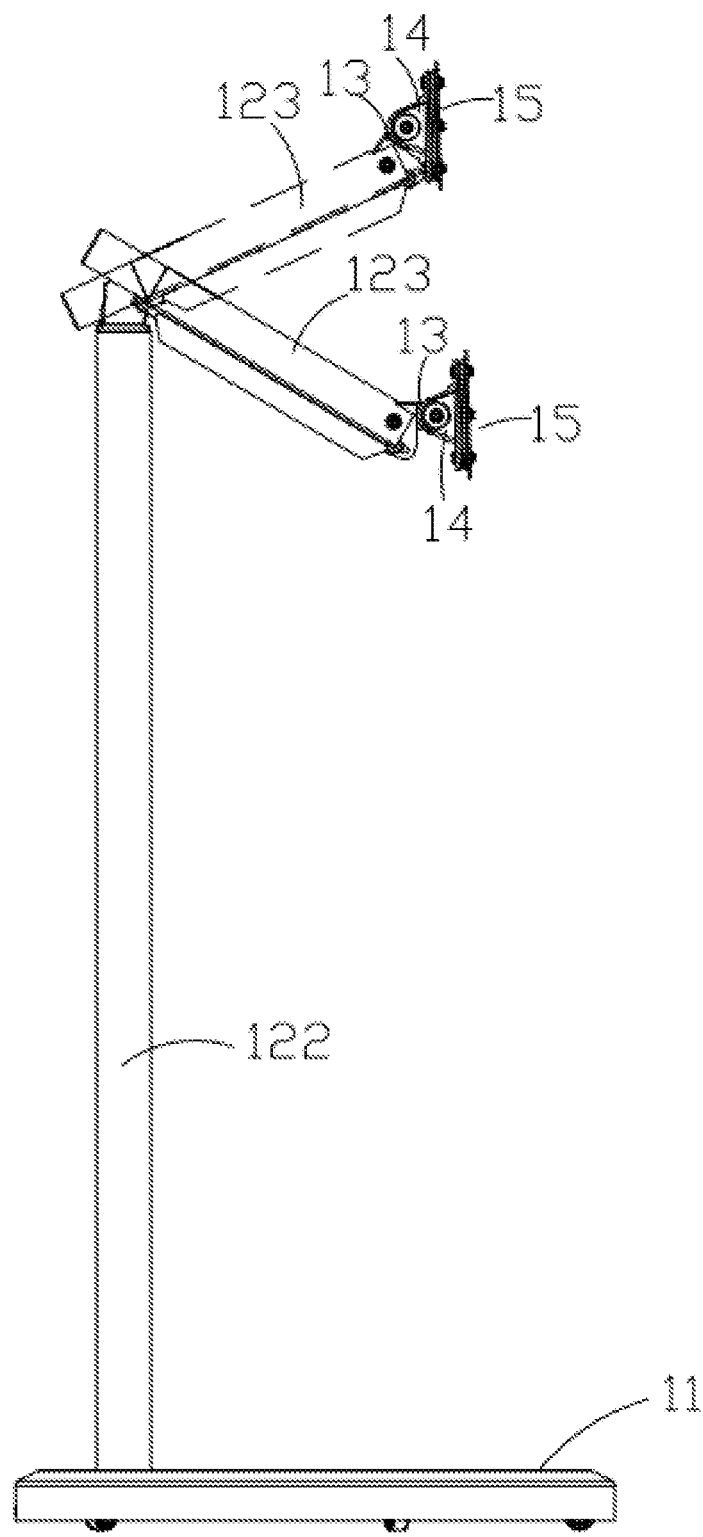
FIG. 35 illustrates a schematic diagram of height adjustment of the mobile bracket in accordance with a fourth embodiment of the present disclosure.
Figure 36:
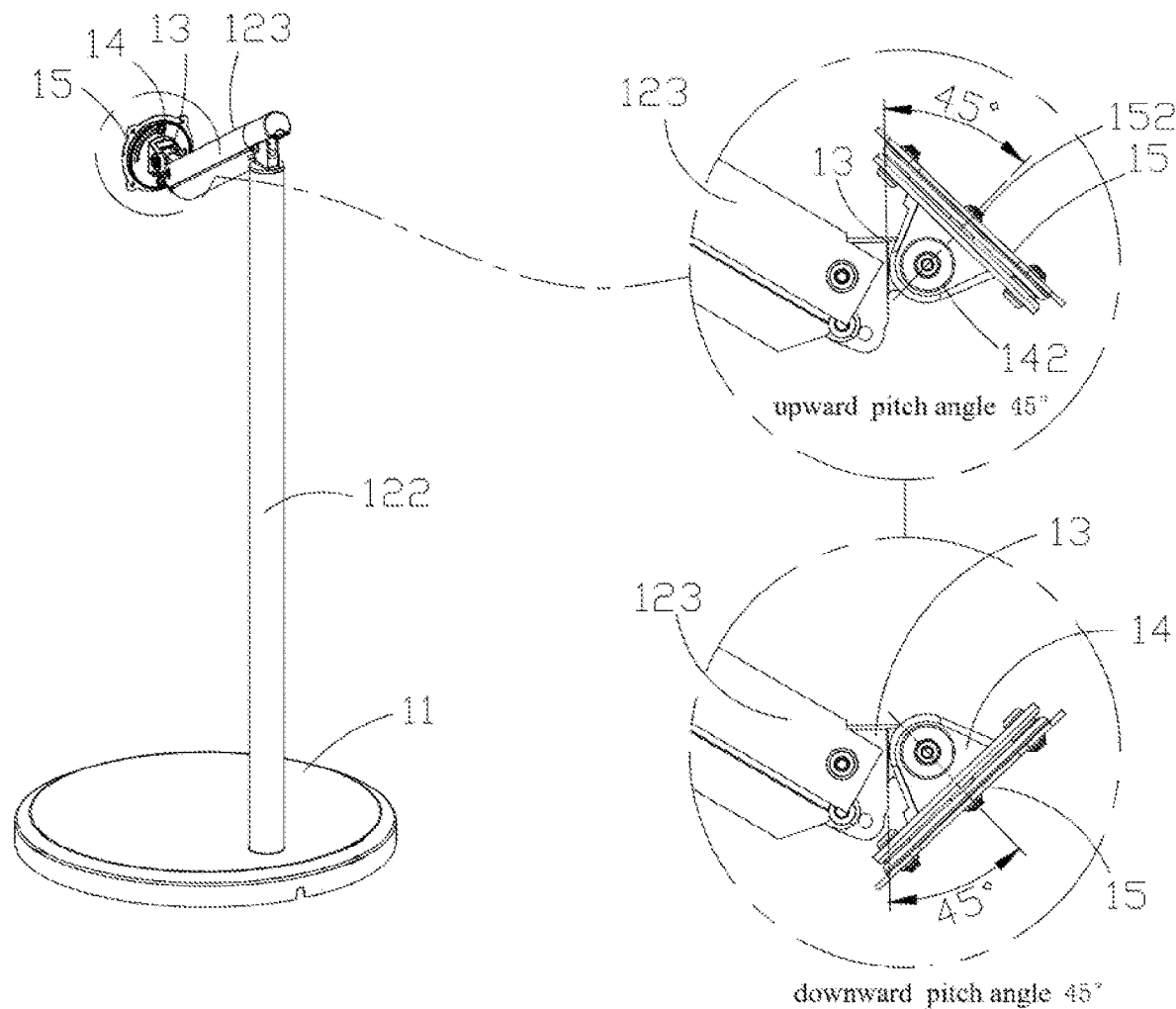
FIG. 36 illustrates a schematic diagram of pitch angle adjustment of the mobile bracket in accordance with the fourth embodiment of the present disclosure.
Figure 37:
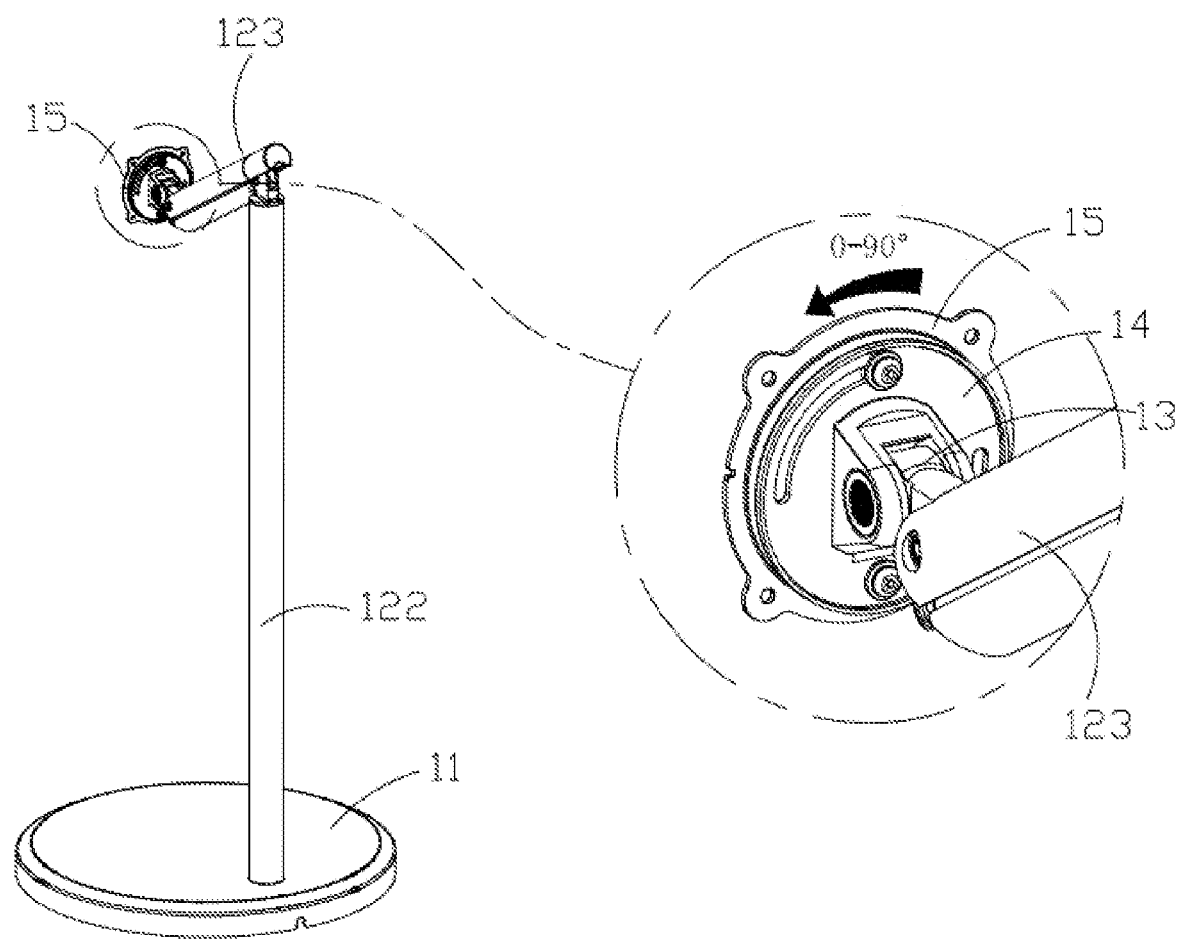
FIG. 37 illustrates a schematic diagram of rotation angle adjustment of the mobile bracket in accordance with the fourth embodiment of the present disclosure.
Figure 38:
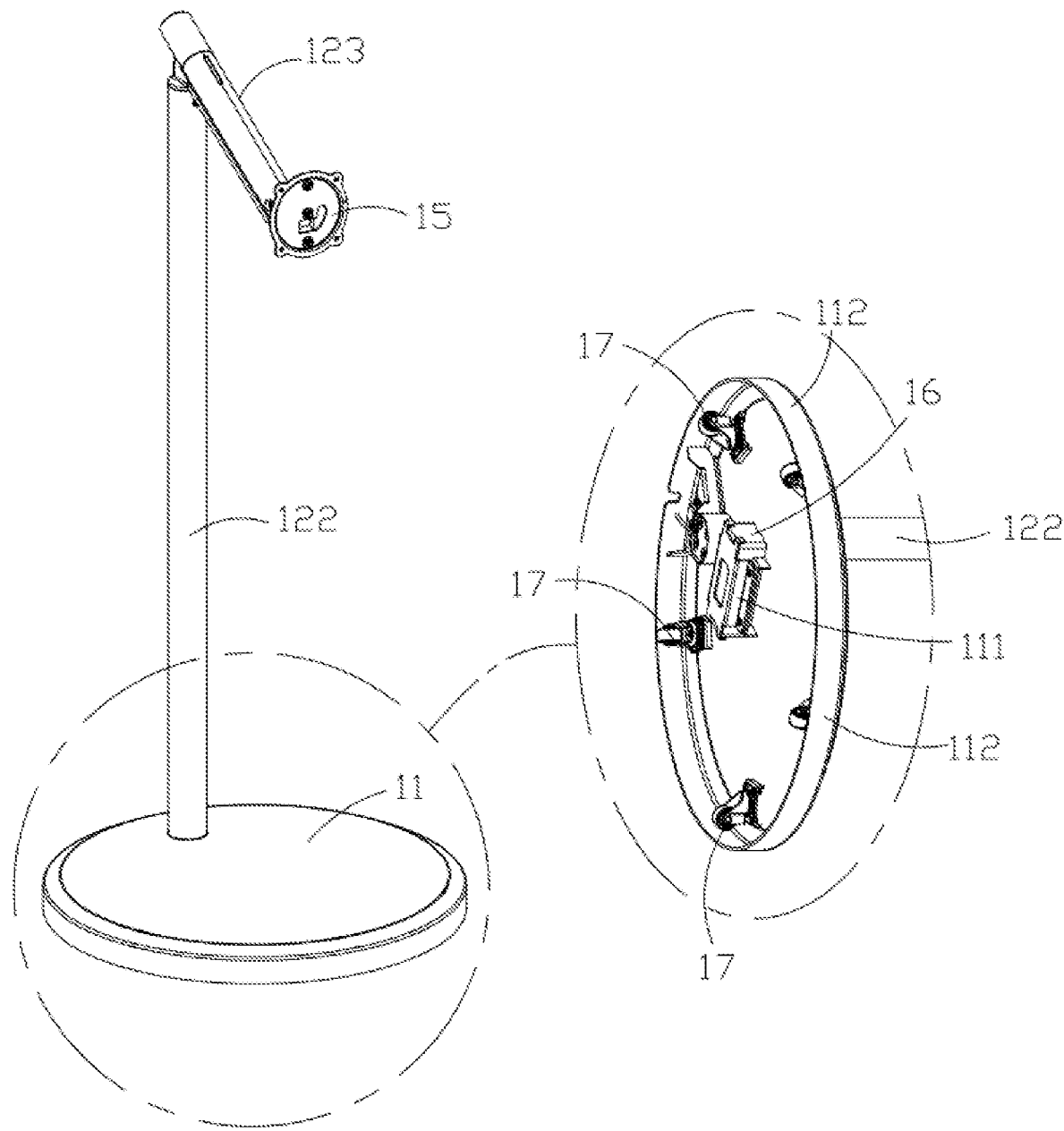
FIG. 38 illustrates a schematic diagram of a bottom base of the mobile bracket in accordance with the fourth embodiment of the present disclosure.
Figure 39:
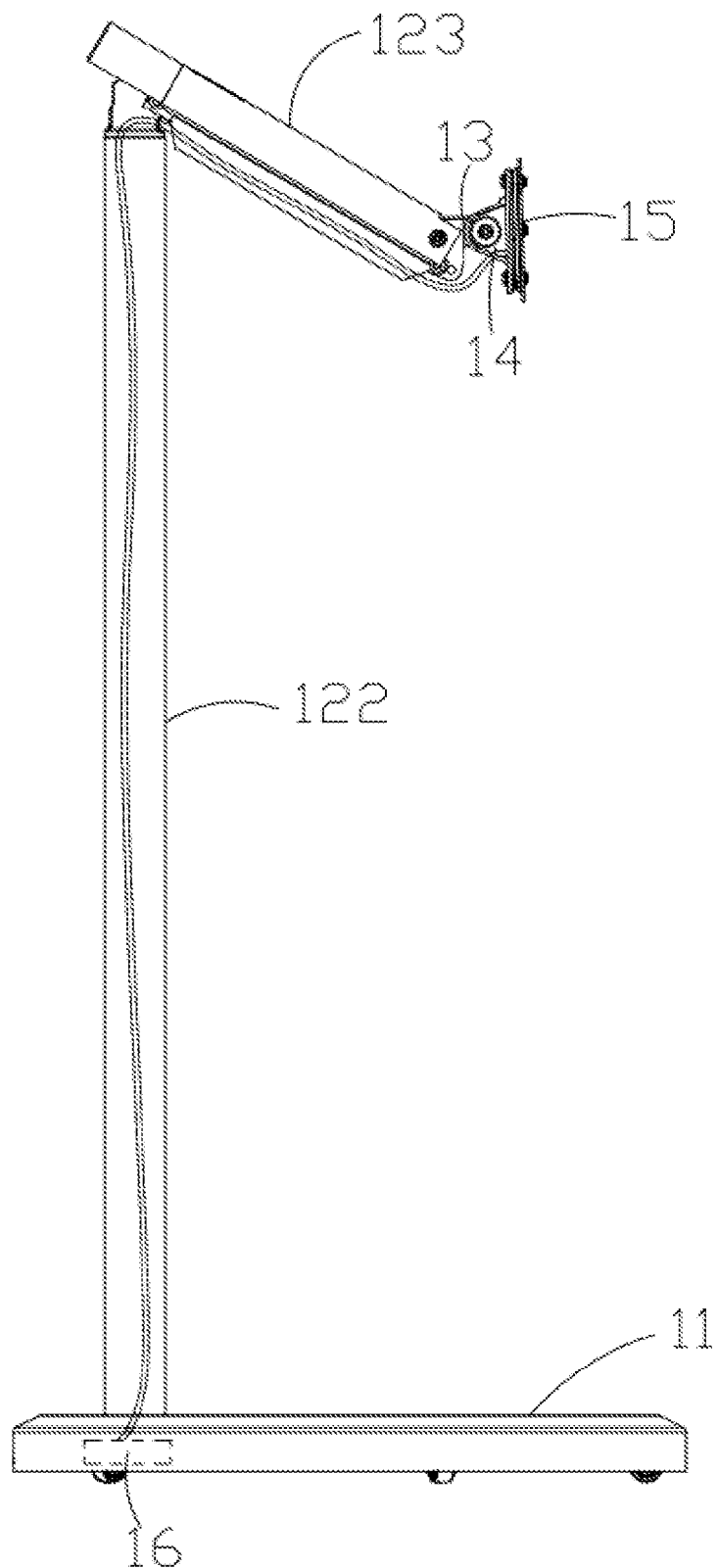
FIG. 39 illustrates a schematic diagram of threading of the mobile bracket in accordance with the fourth embodiment of the present disclosure.

Referring to FIGS. 28 to 39, FIG. 28 illustrates a three-dimensional structural schematic diagram of the mobile bracket from one view in accordance with a fourth embodiment of the present disclosure; FIG. 29 illustrates an exploded diagram of FIG. 28; FIG. 30 illustrates a three-dimensional structural schematic diagram of the mobile bracket from another view in accordance with the fourth embodiment of the present disclosure; FIG. 31 illustrates an exploded diagram of FIG. 30; FIG. 32 illustrates a schematic diagram of an internal structure of a lifting arm after partial shell is removed in accordance with a fourth embodiment of the present disclosure; FIG. 33 illustrates a cross-sectional three-dimensional schematic diagram of FIG. 30 at XXXIII; FIG. 34 illustrates a partially enlarged view of FIG. 33 at XXXIV; FIG. 35 illustrates a schematic diagram of height adjustment of the mobile bracket in accordance with a fourth embodiment of the present disclosure; FIG. 36 illustrates a schematic diagram of pitch angle adjustment of the mobile bracket in accordance with the fourth embodiment of the present disclosure; FIG. 37 illustrates a schematic diagram of rotation angle adjustment of the mobile bracket in accordance with the fourth embodiment of the present disclosure; FIG. 38 illustrates a schematic diagram of a bottom base of the mobile bracket in accordance with the fourth embodiment of the present disclosure; FIG. 39 illustrates a schematic diagram of threading of the mobile bracket in accordance with the fourth embodiment of the present disclosure. The mobile bracket 1 in the fourth embodiment is structurally similar to the mobile bracket 1 in the first embodiment, with the difference that the height of the first supporting rod 12 of the mobile bracket 1 in the fourth embodiment can be adjusted, and the supporting arm 122 and the lifting arm 123 of the first supporting rod 12 can be tilted relative to each other, therefore, the total height of the supporting arm 122 and the lifting arm 123 can be adjusted by adjusting a tilt angle of the lifting arm 123 relative to the supporting arm 122.

Specifically, as shown in FIGS. 28 to 31, the first supporting rod 12 includes a supporting arm 122, a lifting arm 123, and a tilt angle adjusting member 126. The lifting arm 123 is inclined relative to the supporting arm 122. The tilt angle adjusting member 126 is received in the lifting arm 123. The tilt angle adjusting member 126 adjusts the tilt angle of the lifting arm 123 relative to the supporting arm 122. The tilt angle adjusting member 126 causes the lifting arm 123 to be stayed at any angle within a predetermined range of angle adjustment and is capable of providing support for the suspension of the display.

In at least one embodiment, referring to FIG. 32, FIG. 33, and FIG. 34 together, the tilt angle adjusting member 126 includes a first mounting base 1261, a lower connecting rod 1262, an upper tension spring 1263, and a second mounting base 1264. The first mounting base 1261 is connected to a top end of the supporting arm 122, and the second mounting base 1264 is connected to one end of the second supporting rod 13 near the lifting arm 123. In the fourth embodiment, the second mounting base 1264 and the second supporting rod 13 are integrally formed. The second supporting rod 13 extends upwardly at an angle from one end of the second mounting base 1264 far from the first mounting base 1261. The lower connecting rod 1262 is rotatably connected to a bottom end of the first mounting base 1261 and a bottom end of the second mounting base 1264. The upper tension spring 1263 is rotatably connected to a top end of the first mounting base 1261 and the bottom end of the second mounting base 1264. The second mounting base 1264 is connected to the second supporting rod 13. Specifically, the first mounting base 1261 defines a first mounting hole 1265 and a second mounting hole 1266. The first mounting hole 1265 and the second mounting hole 1266 are positioned in an up-and-down relationship. The first mounting hole 1265 and the second mounting hole 1266 extend in a substantially perpendicular direction. The first mounting hole 1265 is located further far from the supporting arm 122 than the second mounting hole 1266. The second mounting base 1264 defines a third mounting hole 1267 and a fourth mounting hole 1268. The third mounting hole 1267 and the fourth mounting hole 1268 are positioned in a generally left-right relationship. The fourth mounting hole 1268 is further far from the lifting arm 123 than the third mounting hole 1267. The lower connecting rod 1262 is rotatably connected to the second mounting hole 1266 of the first mounting base 1261 and the third mounting hole 1267 of the second mounting base 1264. The upper tension spring 1263 is rotatably connected to the first mounting hole 1265 of the first mounting base 1261 and the fourth mounting hole 1268 of the second mounting base 1264.

Therefore, in the fourth embodiment, the upper tension spring 1263 is configured inside the lifting arm 123, and the upper tension spring 1263 plays a certain tensile force in the process of lifting or lowering of the lifting arm 123 so that the display can be stopped at any position.

In at least one embodiment, referring to FIGS. 29 and 31, the lifting arm 123 includes an upper shell 1231 and a bottom shell 1232. The upper shell 1231 and the bottom shell 1232 are both semi-circular shells. It can be understood that in at least one embodiment, the upper shell 1231 and the bottom shell 1232 cooperate with each other to form the lifting arm 123. It can be understood that in at least one embodiment, the tilt angle adjusting member 126 is connected to the supporting arm 122, and the upper shell 1231 and the bottom shell 1232 of the lifting arm 123 are fixed to opposite sides of the tilt angle adjusting member 126.

Referring to FIG. 31, the pitch adjustment assembly 14 includes a rotating shaft 142 and a connecting arm 140. The rotating shaft 142 is fixed to the end of the second supporting rod 13 far from the first supporting rod 12. The connecting arm 140 includes the mounting plate 141, a first arm 143 and a second arm 144 formed by bending and extending in a same direction from opposite ends of the mounting plate 141. The first arm 143 and the second arm 144 are spaced apart from each other. The rotating shaft 142 rotatably connects the first arm 143 and the second arm 144 to the end of the second supporting rod 13 far from the first supporting rod 12. The mounting plate 141 is in a shape of a disk. The rotation adjustment assembly 15 includes a rotating plate 151 and a connecting member 152. The connecting member 152 connects the mounting plate 141 and the rotating plate 151. The rotating plate 151 is capable of rotating relative to the connecting member 152. The rotating plate 151 is configured to be connected to the back of the display. Specifically, the first arm 143 defines a first through hole 1431; and the second arm 144 defines a second through hole 1441. The second supporting rod 13 is cylindrical in shape with a center axis of the cylinder parallel to a center axis of the rotating shaft 142. The cylinder defines a third through hole and a fourth through hole 132 along opposite ends of its center axis. The third through hole is not labeled in FIGS. 29 and 31. It can be understood that the third through hole and the fourth through hole 132 are symmetrically defined on opposite ends of the cylinder. The rotating shaft 142 includes two portions of rotating shaft, namely a first rotating shaft 1421 and a second rotating shaft 1422. The first rotating shaft 1421 is received in the third through hole. The second rotating shaft 1422 is received in the fourth through hole 132. The first rotating shaft 1421 and the second rotating shaft 1422 are butted together and stop-rotating, respectively, within the third through hole and the fourth through hole 132, respectively.

Referring to FIGS. 29 and 31, one end of the connecting member 152 is connected to a cylindrical surface 133 of the cylinder and can swing up and down relative to a circumferential direction of the cylindrical surface 133. Specifically, the cylindrical surface 133 of the cylinder defines a sliding groove 134. The sliding groove 134 is defined extending along a circumferential direction of the cylindrical surface 133. One end of the connecting member 152 is inserted into the sliding groove 134 and is guided by the sliding groove 134 to realize upward and downward sliding, and the other end of the connecting member 152 passes through the mounting plate 141 and is stop-rotationally connected to the mounting plate 141 and rotatably connected to the rotating plate 151.

Therefore, through the guidance of the sliding groove 134, the connecting member 152 swings up and down relative to the sliding groove 134 of the cylinder, making the upward and downward sliding of the rotating plate 151 relative to the cylinder more stable and precise.

Referring to FIG. 35, the tilt angle adjustment member 126 can swing up and down relative to the supporting arm 122, which can drive the display mounted on the rotation adjustment assembly 15 upward or downward, and can adjust a sum of a total height of the supporting arm 122 and the lifting arm 123. Referring to FIG. 36, the pitch adjustment assembly 14 can rotate upwardly or downwardly relative to the second supporting rod 13, which can drive the display mounted on the rotation adjustment assembly 15 upwardly or downwardly. In the fourth embodiment, the pitch adjustment assembly 14 is tilted upward at a maximum upward pitch angle of 45°, the pitch adjustment assembly 14 is tilted downward at a maximum downward pitch angle of 45°. The angle is an angle between a vertical direction and a center line of the connecting member 152.

Therefore, in the present disclosure, it is convenient for the user to adjust the pitch angle of the display to be able to find an appropriate angle of use more easily in the use of standing, lying down, and sitting postures. The viewing experience is more comfortable.

Referring again to FIG. 29, the mounting plate 141 defines a limit slot 1413. The limit slot 1413 is a curved slot centered on a center of the mounting plate 141. The mounting plate 151 defines a fixing hole 1516. The fixing hole 1516 corresponds to the limit slot 1413. The rotation adjustment assembly 15 further includes a limiting member 154. The limiting member 154 passes through the limit slot 1413 and is secured to the fixing hole 1516 in the rotating plate 151. The limiting member 154 may be located at different positions in the limit slot 1413 when the rotating plate 151 is rotated relative to the mounting plate 141.

In at least one embodiment, the limiting slots 1413 are two. The two limiting slots 1413 are symmetrically located relative to the center of the mounting plate 141. The fixing holes 1516 are two. The two fixing holes 1516 are symmetrically located relative to the center of the rotating plate 151.

Therefore, with the two limiting slots 1413, the two fixing holes 1516 and the two limiting members 154, it is possible to make a rotatable connection between the limiting member 154 and the rotating plate 151, and the connection is more stable.

In at least one embodiment, the rotation angle of the rotating plate 151 is clockwise rotation 0° to 90°, which can realize a horizontal and vertical screen conversion of the display, and can make the display bring different visual effects in the horizontal or vertical screen conversions.

In at least one embodiment, referring to FIG. 38, the mobile bracket 1 further includes at least three roller sets 17. The at least three roller sets 17 are located at different locations on a lower surface of the bottom base 11 and spaced apart from the power supply assembly 16. The mobile bracket 1 further includes a shielding ring 112. The shielding ring 112 is bent downwardly from a periphery of the bottom base 11. A distance between a bottom end of the shielding ring 112 and the ground is smaller than a distance between the bottom base 11 and the ground.

Therefore, a rapid movement of the mobile bracket 1 can be realized by the at least three roller sets 17. Utilizing the shielding ring 112 to shield the at least three roller sets 17 allows the shielding ring 112 to be almost near the ground while maintaining the aesthetics of the movement.

Referring to FIG. 39, the supporting arm 122 and the lifting arm 123 define threading holes through which wires are routed between the power supply assembly 16 and the display fixed to the rotation adjustment assembly 15. The power supply assembly 16 is configured to connect to a municipal circuit to supply power to the display mounted on the rotation adjustment assembly 15.

Therefore, the internal wiring can avoid a trouble of managing power wires, and hide the wires while also avoiding cable tangling or broken wires during the functional use of the mobile bracket 1. At the same time, the bottom base 11 has a space reserved for batteries, which can be built-in if needed to allow the display to break free from the wire harness, anytime, anywhere, as you wish to use.

Referring to FIG. 29, FIG. 31 and FIG. 34, the rotation adjustment assembly 15 further includes a shield 153. The shield 153 is located on a side of the mounting plate 141 near the first supporting rod 12 and is hollowed at a position corresponding to the connecting arm 140. The shield 153 covers the mounting plate 141 and the rotating plate 151 on a back of the display.

Therefore, through the shield 153, the connection relationship between the mounting plate 141 and the rotating plate 151 can be obscured, making the appearance more beautiful.

The above description of the technical solution of the subject matter of the present disclosure as well as the corresponding details are described above, and it can be understood that the above description is only at least one embodiment of the technical solution of the subject matter of the present disclosure, and some of the details can also be omitted in its specific implementation.

In addition, in at least one embodiment of the above present disclosure, there are multiple embodiments of the combination of implementation possibilities, various combination programs are limited to space will not be listed. The technical personnel in the field can freely combine the implementation of the above embodiments according to the needs of the specific implementation, in order to obtain a better application experience.

In summary, it can be understood that the present disclosure has the above mentioned excellent characteristics, so that it can be used to enhance the effectiveness of the previous technology has not been practical, and become a very practical value of the product.

The above is only a better example of the present disclosure, and is not intended to limit the present disclosure. Any modification, equivalent substitution or improvement made within the ideas and principles of the present disclosure shall be included in the scope of protection of the present disclosure.

What is claimed is:

1. A mobile bracket, wherein: the mobile bracket comprises a bottom base, a first supporting rod, a second supporting rod, a pitch adjustment assembly and a rotation adjustment assembly, the bottom base is connected to a bottom end of the first supporting rod, the second supporting rod is connected to a top end of the first supporting rod, the pitch adjustment assembly is connected to one end of the second supporting rod far from the first supporting rod, the pitch adjustment assembly is capable of rotating up and down relative to the second supporting rod so as to adjust a pitch angle; the pitch adjustment assembly comprises a mounting plate located at one end far from the first supporting rod; the rotation adjustment assembly is rotatably connected to the mounting plate; the rotation adjustment assembly is capable of rotating around an axis perpendicular to the mounting plate so as to adjust a rotation angle; and the rotation adjustment assembly is configured to be connected to a back of a display;

wherein: the mobile bracket further comprises a power supply assembly, the power supply assembly is located within the bottom base, the first supporting rod defines a first threading hole; the second supporting rod defines a second threading hole; the pitch adjustment assembly defines a third threading hole; the first threading hole, the second threading hole and the third threading hole are interconnected; the first threading hole, the second threading hole and the third threading hole are configured for a wire connected between the power supply assembly and the display connected to the rotation adjustment assembly passing through.

2. The mobile bracket according to claim 1, wherein: the pitch adjustment assembly comprises a rotating shaft and a connecting arm, the rotating shaft is connected to the end of the second supporting rod far from the first supporting rod, the connecting arm is rotatably connected to the rotating shaft, and the connecting arm is capable of rotating around a center axis of the rotating shaft.

3. The mobile bracket according to claim 2, wherein the connecting arm comprises the mounting plate, a first arm and a second arm extending coextensively from opposite ends of the mounting plate; the first arm and second arm are spaced apart from each other, and the rotating shaft rotatably connects the first arm and the second arm to the end of the second supporting rod far from the first supporting rod.

4. The mobile bracket according to claim 3, wherein: the pitch adjustment assembly further comprises a torsion spring and a limiting rod, the torsion spring is threaded onto the rotating shaft, the torsion spring comprises a first free end and a second free end extending in opposite directions, the first free end resists on a top wall within the second supporting rod, the limiting rod is secured between the first arm and the second arm, and is located between the rotating shaft and the mounting plate and is parallel to the rotating shaft, and the second free end is held against a lower side of the limiting rod.

5. The mobile bracket according to claim 3, wherein: the pitch adjustment assembly further comprises a first shell and a second shell, the first shell is connected to the first arm, the second shell is connected to the second arm, the first shell comprises a first hook protruding from an inner wall of the first shell, the first arm defines a first hole corresponding to a position of the first hook; when the first shell is located on an outside of the first arm, the first hook passes through the first hole and is snapped onto an inner wall of the first arm; the second shell comprises a second hook protruding from an inner wall of the second arm; the second arm defines a second hole corresponding to a position of the second hook; and when the second shell is located on an outside of the second arm, the second hook passes through the second hole and is snapped onto an inner wall of the second arm.

6. The mobile bracket according to claim 5, wherein: the first shell comprises a first snap portion at a position far from the mounting plate; the first arm comprises a first inclined portion at a position corresponding to the first snap portion; the first snap portion is snapped onto the first inclined portion; the second shell comprises a second snap portion at a position far from the mounting plate, the second arm comprises a second inclined portion at a position corresponding to the second snap portion; and the second snap portion is snapped onto the second inclined portion.

7. The mobile bracket according to claim 1, wherein: the rotation adjustment assembly comprises a rotating plate and a connecting member, the connecting member connects the mounting plate and the rotating plate, the rotating plate is capable of rotating relative to the connecting member, and the rotating plate is configured to be connected to the back of the display.

8. The mobile bracket according to claim 7, wherein: the mounting plate comprises a protrusion on a side of the mounting plate facing the rotating plate; the rotating plate defines a guiding groove corresponding to the protrusion; the guiding groove is a curved groove centered on a center of the rotating plate; the protrusion is inserted into the guiding groove to form a limit to a rotational travel of the rotation adjustment assembly, and the rotation angle of the rotation adjustment assembly ranges from 0° to 90°.

9. The mobile bracket according to claim 1, wherein: the mobile bracket further comprises a fixing member, the fixing member comprises a supporting body, a first folding portion and a second folding portion located on opposite sides of the supporting body; the first folding portion and the second folding portion are L-shaped and fixed to a lower surface of the bottom base; and a space between the supporting body, the first folding portion and the second folding portion are configured for mounting the power supply assembly.

10. The mobile bracket according to claim 1, wherein: the mobile bracket further comprises at least three roller sets, and the at least three roller sets are located at different positions on the lower surface of the bottom base and spaced from the power supply assembly.

11. The mobile bracket according to claim 10, wherein: the mobile bracket further comprises a shielding ring, the shielding ring is bent downwardly from a peripheral edge of the bottom base, and a distance between a bottom end of the shielding ring and a ground is smaller than a distance between the bottom base and the ground.

12. The mobile bracket according to claim 1, wherein: the first supporting rod comprises a supporting arm, a lifting arm and a height adjusting member; the lifting arm is inserted at one end of the supporting arm far from the bottom base, the height adjusting member is located within the supporting arm and the lifting arm; and the height adjusting member adjusts a protruding length of the lifting arm relative to the supporting arm to adjust a total height between the supporting arm and the lifting arm.

13. The mobile bracket according to claim 12, wherein the height adjusting member is a damped gas spring.

14. The mobile bracket according to claim 12, wherein: the height adjusting member comprises a self-locking gas spring and a control button; the self-locking gas spring is located within the supporting arm and the lifting arm; the control button is connected to one end of the lifting arm far from the supporting arm and pressed against the self-locking gas spring; when the control button is pressed, a protruding height of the lifting arm relative to the supporting arm is adjusted by lifting the lifting arm upwardly or pressing the lifting arm downwardly; and when the control button is released, a height adjustment function of the self-locking gas spring is locked again.

15. The mobile bracket according to claim 1, wherein the first supporting rod comprises a supporting arm, a lifting arm and a tilting angle adjusting member; the lifting arm is tilted relative to the supporting arm, the tilt angle adjusting member is received in the lifting arm; the tilt angle adjusting member adjusts a tilt angle of the lifting arm relative to the supporting arm; and the tilt angle adjusting member causes the lifting arm to be stayed at any angle within a predetermined range of angle adjustment and is capable of providing support for suspension of the display.

16. The mobile bracket according to claim 15, wherein: the lifting arm comprises a first mounting base, a lower connecting rod, an upper tension spring and a second mounting base, the first mounting base is connected to a top end of the supporting arm, the second mounting base is connected to one end of the second supporting rod near the lifting arm, the lower connecting rod is rotatably connected to a bottom end of the first mounting base and a bottom end of the second mounting base, the upper tension spring is rotatably connected to a top end of the first mounting base and the bottom end of the second mounting base, and the second mounting base is connected to the second supporting rod.

17. The mobile bracket according to claim 16, wherein: the pitch adjustment assembly comprises a rotating shaft and a connecting arm, the rotating shaft is fixed to the end of the second supporting rod far from the first supporting rod; the connecting arm comprises the mounting plate, a first arm and a second arm formed by bending and extending in a same direction from opposite ends of the mounting plate; the first arm and the second arm are spaced apart from each other; the rotating shaft rotatably connects the first arm and the second arm to the end of the second supporting rod far from the first supporting rod; the mounting plate is in a shape of a disk; the rotation adjustment assembly comprises a rotating plate and a connecting member; the connecting member connects the mounting plate and the rotating plate; the rotating plate is capable of rotating relative to the connecting member; and the rotating plate is configured to be connected to the back of the display.

18. The mobile bracket according to claim 17, wherein: the mounting plate defines a limit slot, the limit slot is a curved slot centered on a center of the mounting plate, the rotation adjustment assembly further comprises a limiting member, one end of the limiting member is fixed to the rotating plate and the other end of the limiting member is inserted into the limiting slot.

19. The mobile bracket according to claim 17, wherein: the rotation adjustment assembly further comprises a shield, the shield is located on one side of the mounting plate near the first supporting rod and corresponding to the connecting arm, and the shield covers the mounting plate and the rotating plate on the back of the display.

* * * * *